US012684288B2

(12) United States Patent
Corynen

(10) Patent No.: US 12,684,288 B2
(45) Date of Patent: Jul. 14, 2026

(54) LOUDSPEAKER ASSEMBLY

(71) Applicant: PSS BELGIUM NV, Dendermonde (BE)

(72) Inventor: David Corynen, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 116 days.

(21) Appl. No.: 18/847,514

(22) PCT Filed: Dec. 22, 2022

(86) PCT No.: PCT/EP2022/087432
§ 371 (c)(1),
(2) Date: Sep. 16, 2024

(87) PCT Pub. No.: WO2023/174574
PCT Pub. Date: Sep. 21, 2023

(65) Prior Publication Data
US 2025/0211896 A1 Jun. 26, 2025

(30) Foreign Application Priority Data
Mar. 17, 2022 (GB) ...................................... 2203748

(51) Int. Cl.
*H04R 1/34* (2006.01)
*H04R 1/02* (2006.01)
(Continued)

(52) U.S. Cl.
CPC ............... *H04R 1/34* (2013.01); *H04R 1/025* (2013.01); *H04R 1/28* (2013.01); *H04R 1/288* (2013.01);
(Continued)

(58) Field of Classification Search
CPC . H04R 1/025; H04R 1/28; H04R 1/30; H04R 1/288; H04R 1/34; H04R 1/345; H04R 5/023; H04R 2499/13
See application file for complete search history.

(56) References Cited

U.S. PATENT DOCUMENTS 1,840,992 A 1/1932 Weitling
1,984,542 A 12/1934 Olson
(Continued)

FOREIGN PATENT DOCUMENTS

DE 600150 C 7/1934
GB 190822965 A 12/1908
(Continued)

OTHER PUBLICATIONS

Klippel R&D System, "Effective Radiation Area Sd", dated Dec. 19, 2022. Retrieved from the Internet: <URL: https://www.klippel.de/fileadmin/klippel/Files/Know_How/Application_Notes/AN_32_Effective_Radiation_Area. pdf >, 6 pages.
(Continued)

*Primary Examiner* — Huyen D Le
(74) *Attorney, Agent, or Firm* — NK Patent Law

(57) ABSTRACT

A loudspeaker assembly comprising a loudspeaker, a rear enclosure, and a waveguide is disclosed. The loudspeaker includes: a diaphragm, a drive unit, and a frame. The diaphragm has a first radiating surface for radiating sound forward and a second radiating surface for radiating sound rearward. The first and second surfaces are located on opposite faces of the diaphragm. The drive unit moves the diaphragm based on an electrical signal. The diaphragm is suspended from the frame. The rear enclosure encloses a volume configured to receive sound produced by the second surface. The rear enclosure includes regions of porous material configured to allow sound produced by the second surface to exit the volume. The waveguide directs sound
(Continued)

produced by the first surface forward towards a mouth. The waveguide includes regions of porous material to allow sound produced by the first surface to exit the waveguide.

14 Claims, 29 Drawing Sheets

(51) Int. Cl.

| | |
|---|---|
| ***H04R 1/28*** | (2006.01) |
| ***H04R 1/30*** | (2006.01) |
| ***H04R 5/02*** | (2006.01) |

(52) U.S. Cl.

CPC ............... *H04R 1/30* (2013.01); *H04R 1/345* (2013.01); *H04R 5/023* (2013.01); *H04R 2499/13* (2013.01)

(56) References Cited

U.S. PATENT DOCUMENTS

| | | | | |
|---|---|---|---|---|
| 3,174,578 A | 3/1965 | Kojima | | |
| 5,115,883 A * | 5/1992 | Morikawa | H04R 1/30 | 181/152 |
| 5,432,860 A | 7/1995 | Kasajima et al. | | |
| 6,681,024 B2 * | 1/2004 | Klein | H04R 5/02 | 381/301 |
| 2021/0105557 A1 | 4/2021 | Blore et al. | | |
| 2023/0117408 A1 * | 4/2023 | Vuine | H04R 1/025 | 381/398 |

FOREIGN PATENT DOCUMENTS

| | | | |
|---|---|---|---|
| GB | 225976 | A | 12/1924 |
| GB | 2597988 | A | 2/2022 |
| JP | H11234784 | A | 8/1999 |
| WO | 2016134861 | A1 | 9/2016 |
| WO | 2018193154 | A1 | 10/2018 |
| WO | 2019121266 | A1 | 6/2019 |
| WO | 2020234316 | A1 | 11/2020 |
| WO | 2021185777 | A1 | 9/2021 |
| WO | 2022048810 | A1 | 3/2022 |
| WO | 2023030847 | A1 | 3/2023 |

OTHER PUBLICATIONS

EPO; International Search Report and Written Opinion for corresponding PCT Patent Application No. PCT/EP2022/087432, mailed Apr. 14, 2023, 10 pages.

* cited by examiner

LOUDSPEAKER ASSEMBLY

CROSS-REFERENCE TO RELATED APPLICATIONS

This application is a U.S. National Stage Application of International Patent Application No. PCT/EP2022/087432 filed Dec. 22, 2022, which claims priority to United Kingdom Patent Application No. GB2203748.5, filed Mar. 17, 2022.

FIELD OF THE INVENTION

The present invention relates to a loudspeaker assembly.

BACKGROUND

Traditional bass loudspeakers radiate sound in all directions. For example, nuisance from neighbouring loud music mostly has a low frequency spectrum.

Sometimes a person may wish to listen to audio without bothering people near them in the same room. Some personal entertainment systems (music, games & television) are typically equipped with headphones to ensure the user receives personalised sound, without disturbing (or being disturbed by) other people nearby who do not wish to hear the same audio. However, although the usage of headphones ensures a good sound quality and a very effective personal sound cocoon (little sound leakage), the use of headphones has safety, ergonomic and comfort problems.

A highly directional loudspeaker which produces sound directed to a chosen space and minimises sound leakage outside of the chosen space may provide an alternative to headphones.

Some conventional loudspeakers can produce directional sound. For example:

- Arrays of loudspeakers have been shown to produce directional sound. However, this solution is costly, bulky, and complicated because multiple loudspeakers are required.
- Horn loaded loudspeakers (for example as seen in U.S. Pat. Nos. 1,984,542, 1,840,992, DE600150, GB190822965, GB225976, U.S. Pat. No. 3,174,578, US2021105557) are generally used to increase the efficiency of sound production by providing acoustic impedance matching for the diaphragm with a side effect that the directivity of the loudspeaker is increased. However, this side effect is typically limited to wavelengths that are comparable to or smaller than the dimensions of the horn. Thus, for compact horns (e.g. length smaller than 20 cm, or even those up to 50 cm in length) low frequencies will be unaffected and would remain substantially omnidirectional. Conventional horn loudspeakers would need to be large to be directive at low frequencies.
- Acoustic interference tubes (for example as seen in WO2016134861 and JPH11234784) rely on destructive interference of sound which propagates outward along the tube. The directionality of interference tubes for low frequencies is also related to the dimensions of the tube and known interference tubes must also be large to be directive at low frequencies.

Accordingly, it is generally impractical in most situations to make a loudspeaker directive at bass frequencies. To provide a highly directive loudspeaker for bass frequencies, the dimensions of the radiating surface must generally be of the same order as the wavelength (e.g. $\lambda$=3.4 m for bass frequency f=100 Hz). Loudspeakers of this scale are impractical for producing personalised sound (for example in a car or in one part of a room). Nonetheless, bass frequency content is a very important part of the audio spectrum and in most music this spectrum represents half or more of the total sound power.

WO2021185777 discloses loudspeakers in which a radiating surface of the diaphragm is enclosed at least in part by one or more portions of porous material. As explained in WO2021185777, such loudspeakers have been found to be capable of producing a good cardioid polar response over a wider frequency bandwidth by appropriately configuring the one or more portions of porous material. Furthermore, the one or more portions of porous material may be incorporated into a self-supporting porous shell, as described in GB2112473.0 (not currently published).

Loudspeaker constructions according to WO2021185777 can result in an increased directivity over a wider frequency bandwidth. However, the present inventor has observed that for higher frequencies, the directivity of a loudspeaker construction according to WO2021185777 remains dictated by the dimensions of the loudspeaker diaphragm.

Accordingly, a loudspeaker may be desired for producing personalised sound which is highly directional across a broad range of frequencies.

The present invention has been devised in light of the above considerations.

SUMMARY OF THE INVENTION

The present inventor has surprisingly found that the interaction of bass frequencies seen in cardioid loudspeakers can be combined with a porous waveguide arrangement to produce a highly directional loudspeaker with good performance across a broad frequency range.

A first aspect of the present invention provides:

a loudspeaker assembly comprising:

a loudspeaker, including:

- a diaphragm having a first radiating surface for radiating sound in a forward direction and a second radiating surface for radiating sound in a rear direction, wherein the first radiating surface and the second radiating surface are located on opposite faces of the diaphragm;
- a drive unit configured to move the diaphragm based on an electrical signal;
- a drive unit frame, wherein the diaphragm is suspended from the drive unit frame via one or more loudspeaker suspension elements;

a rear enclosure that encloses a volume configured to receive sound produced by the second radiating surface, wherein the rear enclosure includes one or more regions of porous material configured to allow sound produced by the second radiating surface to exit the volume enclosed by the rear enclosure via the one or more regions of porous material;

a waveguide for directing sound produced by the first radiating surface in the forward direction towards a mouth of the waveguide, wherein the waveguide includes one or more regions of porous material configured to allow sound produced by the first radiating surface to exit the waveguide via the one or more regions of porous material.

Advantageously, a loudspeaker assembly according to the first aspect of the invention is able to produce highly directive sound across a broad frequency range, compared with prior art loudspeakers.

Without wishing to be bound by theory, the inventor believes this is because the regions of porous material in the waveguide allow sound produced by the first radiating surface to exit the waveguide (via the one or more regions of porous material included in the waveguide) where it can interact with sound produced by the second radiating surface. This interaction is believed to result in destructive interference thereby suppressing sound in directions other than in the forward direction.

This cancellation effect is believed to be particularly effective for bass frequencies because they are more omnidirectional than mid-high frequencies. At higher frequencies, the walls of the waveguide can direct sound in a more conventional manner (via reflection) to improve directivity at such frequencies. Accordingly, the resulting loudspeaker assembly is more directive at a broader range of frequencies than simple horn loudspeakers seen in the prior art.

Without wishing to be bound by theory, the porous material in the waveguide that allows sound produced by the first radiating surface to exit the waveguide is believed to act as a form of acoustic resistance, introducing a time delay to the sound waves which pass through it. Similarly, the porous material in the rear enclosure that allows sound produced by the second radiating surface to exit the rear enclosure is believed to act as a form of acoustic resistance, introducing a time delay to the sound waves which pass through it. Therefore, it is believed that appropriate tuning of the specific airflow resistances of the porous material in the waveguide and in the rear enclosure may be performed to help optimize the cancellation of sound waves and improve the directionality of the loudspeaker system.

The drive unit may be an electromagnetic drive unit that includes a magnet unit configured to produce a magnetic field in an air gap, and a voice coil attached to the diaphragm, wherein the voice coil is configured to sit in the air gap when the diaphragm is at rest. When the loudspeaker is in use, the voice coil may be energized (e.g. by having the electrical signal pass through it) to produce a magnetic field which interacts with the magnetic field produced by the magnet unit and which causes the voice coil (and therefore the diaphragm) to move along a movement axis relative to the magnet unit. Such drive units are well known.

The waveguide may include one or more walls configured to direct sound towards the mouth of the waveguide. The waveguide may be mounted to the remainder of the loudspeaker assembly at a proximal end of the waveguide. The mouth of the waveguide may be located at a distal end of the waveguide which is substantially exposed to the environment such that sound radiated by the first radiating surface is allowed to radiate out from the mouth to the surrounding environment. The mouth may be an open end which is completely open to the environment. Alternatively, the mouth may be covered by a grille or material, e.g. a material with a low acoustic resistivity.

For the purpose of this invention, a porous material can be understood to be any material that is configured to allow airflow therethrough. Examples of porous materials may include woven and non-woven fibrous materials such as felt, paper, an extra fine metal mesh, a dense woven fabric or micro-perforated materials.

The one or more regions of porous material in the waveguide may have a specific airflow resistance of at least 500 Pa·s/m (more preferably 1000 Pa·s/m).

A specific airflow resistance of porous material in the waveguide of at least 500 Pa·s/m (or more preferably 1000 Pa·s/m) is believed to help provide a useful degree of acoustic resistance to the sound at higher frequencies to help direct sound at such frequencies towards the mouth of the waveguide. If the acoustic resistance of the one or more regions of porous material in the waveguide is too low, then the waveguide may become acoustically transparent to the higher frequencies and the guiding effect of the waveguide may reduce the directivity of the loudspeaker assembly at higher frequencies. But the specific airflow resistance chosen for porous material in the waveguide may vary, e.g. according to application requirements.

The one or more regions of porous material in the waveguide may have a specific airflow resistance of 5000 Pa·s/m or less (more preferably 2000 Pa·s/m or less).

A specific airflow resistance of porous material in the waveguide of 5000 Pa·s/m or less (or more preferably 2000 Pa·s/m or less) is believed to help allow an adequate amount of sound to exit the waveguide to achieve the cancellation and sound suppression effects described above. If the one or more regions of porous material in the waveguide are too resistive then the waveguide may start to behave too much like a closed waveguide, reducing or preventing the amount of sound which can pass through. Moreover, if the porous material is too resistive this can overly increase the time delay which is applied to the sound waves passing therethrough. This can adversely affect the tuning and interaction of the sound exiting the waveguide with the sound exiting the rear enclosure jeopardizing the cancellation effect and directivity of the loudspeaker assembly. Again, the specific airflow resistance chosen for porous material in the waveguide may vary, e.g. according to application requirements.

In some examples, the one or more regions of porous material in the waveguide may have a specific airflow resistance in the range 500-5000 Pa·s/m (more preferably 1000-2000 Pa·s/m). Such ranges have been found to be particularly useful in achieving the advantages described above.

In some examples, the one or more regions of porous material in the rear enclosure may have a specific airflow resistance of at least 1000 Pa·s/m (more preferably 2000 Pa·s/m).

A specific airflow resistance of porous material in the rear enclosure of at least 1000 Pa·s/m (or more preferably 2000 Pa·s/m) is believed to provide a useful degree of acoustic resistance to the sound at higher frequencies to suppress the amount of sound at higher frequencies that exits the rear enclosure. But the specific airflow resistance chosen for porous material in the rear enclosure may vary, e.g. according to application requirements.

In some examples, the one or more regions of porous material in the rear enclosure may have a specific airflow resistance of 10000 Pa·s/m or less (more preferably 4000 Pa·s/m or less).

A specific airflow resistance of 10000 Pa·s/m or less (more preferably 4000 Pa·s/m or less) is believed to help allow an adequate amount of sound to exit the rear enclosure to achieve the cancellation and sound suppression effects described above. If the specific airflow resistance is too high the rear enclosure may start to behave too much like an acoustically closed box which could reduce the cancellation effect and cause the loudspeaker to act more like a monopole at low frequencies with poor sound directivity. Again, the specific airflow resistance chosen for porous material in the rear enclosure may vary, e.g. according to application requirements.

In some examples, the one or more regions of porous material in the rear enclosure may have a specific airflow resistance in the range 1000-10000 Pa·s/m (more preferably 2000-4000 Pa·s/m). Such ranges have been found to be particularly useful in achieving the advantages described above.

In some examples, the one or more regions of porous material in the rear enclosure may have a higher specific airflow resistance than the one or more regions of porous material in the waveguide. More preferably the specific airflow resistance of the one or more regions of porous material in the rear enclosure may be higher than the specific airflow resistance of the one or more regions of porous material in the waveguide by a value that is 500 Pa s/m or higher, more preferably 1000 Pa s/m or higher. This value may be between 500 Pa s/m-2500 Pa s/m, more preferably between 1000 Pa s/m-2000 Pa s/m. In some cases, this value may be, e.g. 1500 Pa s/m.

Having a porous material in the rear enclosure which has a higher specific airflow resistance in that the porous material in the waveguide is useful to produce a cardioid polar response which is particularly directive. As discussed above, the one or more regions of porous material in the rear enclosure introduces a time delay to sound produced by the second radiating surface as it exits the rear enclosure where it interacts with sound produced by the first radiating surface. The inventor has found that when the loudspeaker assembly has no waveguide, as discussed in WO2021185777, forming the one or more regions of porous material in the rear enclosure with a material having a specific airflow resistance of 1500 Pa s/m results in a cardioid response which is highly directive.

However, the one or more regions of porous material in the waveguide also imposes a time delay to sound being radiated by the first radiating surface which exits the waveguide via the regions of porous material in the waveguide. Therefore, to maintain a relative time delay between sound being radiated by the second radiating surface and sound being radiated by the first radiating surface it is advantageous to use a porous material in the rear enclosure which has a higher specific airflow resistance than the porous material in the waveguide. Accordingly, the use of a porous material in the rear enclosure which has a specific airflow resistance 500 Pa s/m-2500 Pa s/m higher (more preferably 1000 Pa s/m-2000 Pa s/m higher, more preferably 1500 Pa s/m higher) than the specific airflow resistance of the one or more regions of porous material in the waveguide can result in a partially directive cardioid polar response improving the overall directivity of the loudspeaker assembly.

In some examples, the specific air flow resistance of the one or more regions of porous material in the rear enclosure may be at least 50% higher (and more preferably between 50% and 150% higher) than the specific airflow resistance of the one or more regions of porous material in the waveguide. Again this may be helpful to improve the cancellation effect described above and produce a cardioid response which is particularly directive.

As can be seen from the experiments discussed below, a specific airflow resistance of 1000-2000 Pa·s/m (e.g. 1500 Pa·s/m) for the regions of porous material in the waveguide combined with a specific airflow resistance of 2000-4000 Pa·s/m (e.g. 3000 Pa·s/m) for the regions of porous material in the rear enclosure has been found to produce particularly good results (i.e. a loudspeaker assembly which has high directionality across a broad frequency range).

Specific airflow resistance of the regions of porous material may be measured in accordance with ISO 9053-1 or ISO 9053-2.

For the purpose of this disclosure, materials with a specific airflow resistance of more than 10000 Pa·s/m may be considered to be non-porous.

The one or regions of porous material in the waveguide may provide at least 30% (more preferably at least 50%, more preferably at least 75%, in some cases 100%) of the externally facing surface area of the waveguide. This is believed to help allow an adequately significant amount of sound to exit the waveguide to achieve the cancellation described above. If the area of the waveguide including regions of porous material is too small, it is believed that the waveguide may begin to act more like a conventional closed and reflective waveguide which could reduce the directivity of the loudspeaker assembly at lower frequencies. Of course, the amount of externally facing surface area of the waveguide provided by the porous material may vary significantly according to application requirements.

In some examples, the waveguide may be entirely formed from the one or more regions of porous material. Alternatively, the waveguide may comprise rigid portions to which one or more regions of porous material are mounted.

In some examples, the waveguide may be entirely formed from one or more regions of porous material which are self-supporting. To achieve this, a porous material may be chosen which is sufficiently stiff or thick enough to be self-supporting. In other examples, a self-supporting waveguide may be achieved using a less stiff porous material by implementing a shape of waveguide which is an inherently strong shape, such as a cone.

The one or more regions of porous material in the rear enclosure may provide at least 30% (more preferably at least 50%) of the externally facing surface area of the rear enclosure. This is believed to help allow an adequate amount of sound to exit the rear enclosure to achieve the cancellation effects described above while avoiding or reducing blowing noises. If the regions of porous material in the rear enclosure provide too little of the externally facing surface area of the rear enclosure, it is believed that the rear enclosure may begin to act more like a closed box, monopole loudspeaker and the directivity of the loudspeaker assembly at lower frequencies may decrease. Providing a smaller area with porous material may be possible by compensating for this by using a porous material with a lower specific airflow resistance to ensure that an adequate amount of sound can still exit the rear enclosure to achieve the cancellation effects described. However, if the area provided by the regions of porous material becomes too small, then more energy must pass through a smaller area to achieve the same level of cancellation and sound directivity and this may begin to result in blowing noises. Of course, the amount of externally facing surface area of the rear enclosure provided by the porous material may vary significantly according to application requirements.

In some examples, the rear enclosure may be entirely formed from the one or more regions of porous material. Alternatively, the rear enclosure may comprise rigid portions to which one or more regions of porous material are mounted.

In some examples, the rear enclosure may be entirely formed from one or more regions of porous material which are self-supporting. To achieve this, a porous material may be chosen which is sufficiently stiff or thick enough to be self-supporting. In other examples, a self-supporting rear enclosure may be achieved using a less stiff porous material by implementing a shape of waveguide which is an inherently strong shape, such as a dome.

The mouth of the waveguide may be located at a distance that is in the range 100-500 mm (more preferably 100-200 mm, more preferably 150 mm) from a location on the first radiating surface, as measured in the forward direction. As can be seen from the experiments discussed below, a waveguide of this length demonstrates good suppression of sound heard in directions other than in the forward direction.

The waveguide may have one or more walls that diverge in the forward direction (in which case the waveguide may be referred to as a horn).

In some examples, the waveguide may have a conical shape with a circular cross section (in which case the waveguide may be referred to as a conical horn). The opening angle of the conical horn may be in the range 10°-35° (more preferably 15°-25°, more preferably) 22.5°.

However, alternative waveguide forms are possible. For example, a horn with walls that diverge in the forwards direction may have a square, rectangular or any other non-circular shaped cross-section. Waveguides with non-diverging walls are also possible and may be tailored to suit a chosen application.

As mentioned above, the mouth of the waveguide may be an open end which is completely open to the environment. Alternatively, the mouth may be covered by a grille or material with a low acoustic resistivity.

However, in some examples, the mouth of the waveguide may be covered by a material. The material covering the mouth of the waveguide (if present) may have an acoustic resistivity that is the same as, or different from, the one or more regions of porous material included in (e.g. one or more walls forming) the waveguide.

In some examples, the material covering the mouth of the waveguide (if present) may have the same acoustic resistivity as the remainder of the waveguide. In these examples, the one or more walls of the waveguide and the and the material covering the mouth may be formed of one, continuous piece of material.

In some examples, the material covering the mouth of the waveguide (if present) may be a hard, reflective material (e.g. plastic) configured to reflect sound incident thereon. Note that in these examples, sound produced by the first radiating surface may still exit the waveguide via the one or more regions of porous material in the one or more walls of the waveguide.

In some examples, the loudspeaker assembly (including the mouth of the waveguide) may be enclosed by an outer shell wherein the outer shell includes one or more regions of a second porous material. The outer shell may be formed entirely from the second porous material. The porous material of the outer shell may have a lower acoustic resistivity than the porous material of the waveguide.

Advantageously, the inventors have found that the directivity performance of the loudspeaker assembly can still be acceptable even when the mouth of the waveguide is covered (e.g. with an acoustically resistive or reflective material). In particular, although the SPL performance of the loudspeaker may be reduced as the acoustic resistivity of a material covering the mouth is increased, the performance may still be acceptable (see e.g. FIGS. 18-23 as discussed below). Moreover, covering the mouth of the waveguide with a material, or enclosing the loudspeaker assembly in a shell, may help to adapt the loudspeaker assembly for use in more applications and/or be more easily hidden from view or protected without impacting too much on directivity performance, e.g. in accordance with design requirements.

In some examples, the loudspeaker assembly may be mounted on or next to a baffle configured to reflect sound incident thereon. The baffle may, for example, take the form of a wall. The baffle may, for example, form one or more side walls of the waveguide thus helping to guide sound produced by the first radiating surface of the diaphragm. The present inventors have found that mounting the loudspeaker assembly on or next to a baffle may help to increase the directivity performance of the loudspeaker assembly at higher frequencies (see e.g. FIGS. 18-23 as discussed below).

The loudspeaker assembly may further comprise one or more wings projecting outwardly from the remainder of the loudspeaker assembly in a lateral direction. Here a lateral direction may be taken as any direction which has at least a component which is perpendicular to the forward direction.

The one or more wings may be mounted to the remainder of the loudspeaker assembly at one or more locations which are rearwards of the waveguide. The one or more wings may, for example, be mounted on the rear enclosure, mounted adjacent to the rear enclosure or mounted rearwards of the rear enclosure.

The one or more wings may include one or more regions of porous material. The regions of porous material in the reflector/absorber wings may have a specific airflow resistance in the range 500 to 10000 Pa·s/m (more preferably 2000 Pa·s/m to 4000 Pa·s/m).

Wings including porous material (which may be referred to as "absorber wings") may help to reduce leakage to the local environment of sound at higher frequencies and thereby help to improve the directionality of the loudspeaker assembly. It is believed that, by including one or more regions of porous material in the wings, they are able to partially absorb and reflect sound at higher frequencies which has exited the rear enclosure (via the one or more regions of porous materials in the rear enclosure). It is believed that this reduces the volume of high frequency sound radiating in the rear direction and causes some of the high frequency sound exiting the rear enclosure to be reflected in the forwards direction thus increasing the overall directivity of the loudspeaker assembly at higher frequencies.

In other examples, the one or more wings may be made from a non-porous material which can reflect sound (such wings may be referred to as "reflector wings"). Reflector wings which are reflective may reflect high frequency sound, originally radiated in the rear direction, towards the mouth of the waveguide. Thus, the loudspeaker assembly may have an overall higher directivity at higher frequencies.

The loudspeaker assembly may further comprise a portion of porous material located in front of the second radiating surface in the volume enclosed by the rear enclosure. This portion of porous material provides additional acoustic absorption which may help to decrease the sound pressure level of high frequency sound (above 1 kHz) radiated from the second radiating surface.

The loudspeaker may be configured to be driven at frequencies including the range 250 Hz-4 kHz, preferably in the range 100 Hz-10 kHz, or more preferably 40 Hz-20 KHz.

The loudspeaker assembly may include a light source wherein the light source is configured to project light from the mouth of the waveguide.

The waveguide may be configured to function as a light shade for directing the light as well as performing as an acoustic waveguide. Therefore, a highly directional loudspeaker and light source is provided which is more compact than solutions which may have separate light sources and loudspeakers.

The light source may be any electrical light source which can be fitted inside the loudspeaker assembly. Example electrical light sources may include an LED (light emitting diode), a filament bulb, or a gas discharge tube. Suitable LEDs include COB (chip-on-board), DIP (dual in-line package), and SMD (surface mounted device) LEDs.

The light source may be located in the waveguide in front of the first radiating surface of the diaphragm.

In other examples, the light source may be located in the loudspeaker, wherein the loudspeaker includes a transparent element or opening in a forward-facing surface of the loudspeaker that is configured to allow light from the light source to pass therethrough. The transparent element may include translucent elements or any other element which allows light to pass therethrough.

The transparent element may be a transparent dust cap mounted in front of the loudspeaker drive unit and diaphragm. In other examples, the transparent element may include a lens which is mounted above the drive unit and may act as a phase plug whereby it is able to transmit sound and light into the waveguide.

A second aspect of the present invention may provide a headrest including a loudspeaker assembly according to the first aspect of the present invention.

The waveguide of the loudspeaker assembly may be at least partially formed by internal contours of the headrest.

Advantageously, the headrest may be included in a car seat so that passengers can listen to personalized audio without the need for headphones. The highly directional loudspeaker assembly may help to provide sound directed towards the head of a passenger sat on the seat in front of the loudspeaker assembly across a broad frequency range, while ensuring that there is minimal sound leakage towards passengers on either side.

The headrest may include first and second loudspeaker assemblies according to the first aspect of the present invention. The first and second loudspeaker assemblies may be positioned within the headrest such that, in use: the waveguide of the first loudspeaker assembly directs sound produced by the first radiating surface of the first loudspeaker assembly towards a first ear of a user sat in the seat, and the waveguide of the second loudspeaker assembly directs sound produced by the first radiating surface of the second loudspeaker assembly towards a second ear of the user sat in the seat. For example, this might be achieved by locating the first and second loudspeaker assemblies at opposite sides of the headrest such that, when a user is sat in the seat, the waveguides of the mouths of the first and second loudspeaker assemblies face towards the head of the user (e.g. preferably towards respective ears of the user sat in the seat).

Such an arrangement may help to improve user experience and sound quality because sound may be directed towards a respective ear of the user by each loudspeaker assembly, which may be useful in providing stereo sound for the user (e.g. by supplying a respective audio channel of the stereo sound to each loudspeaker assembly).

The headrest may further include a third loudspeaker. The third loudspeaker may be a bass loudspeaker mounted in the headrest. The first and second loudspeakers may be respectively located on either side of the bass loudspeaker. The bass loudspeaker may be, for example, as described in WO2019121266.

By providing the third loudspeaker in the headrest, better quality sound may be produced since different sized loudspeakers can be used for different frequency ranges, resulting in overall better sound, particularly at bass frequencies which benefit from the use of a loudspeaker having a larger diaphragm.

The bass loudspeaker may be configured to produce sound having frequencies in at least the range 60-80 Hz, more preferably 40-100 Hz.

A third aspect of the present invention may provide a lamp including a loudspeaker assembly according to the first aspect of the present invention.

Preferably in this third aspect, the loudspeaker assembly includes a light source for projecting light from the mouth of the waveguide. Various implementations of such a light source have already been discussed above.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Figure 1A:
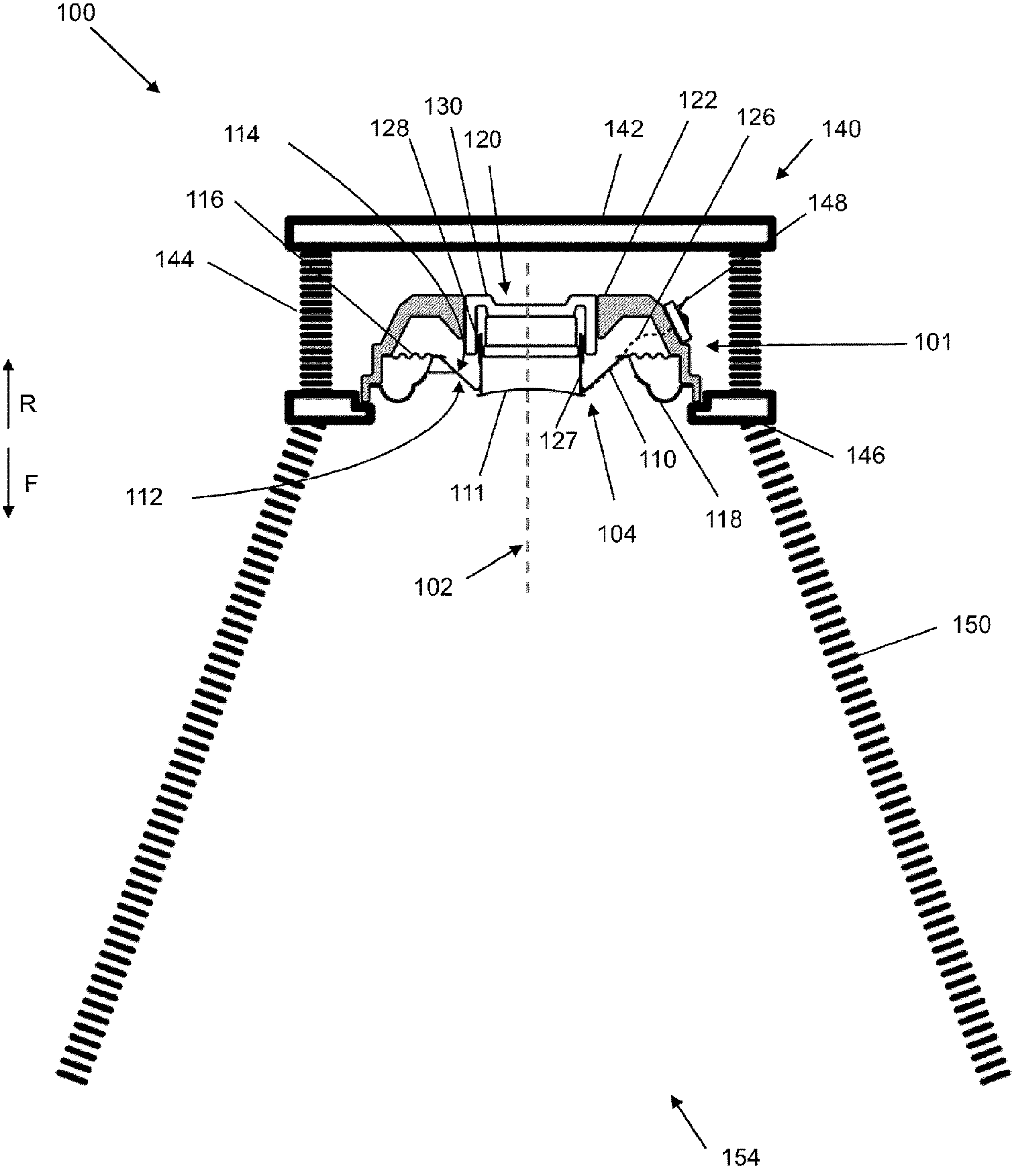
FIG. 1*a* shows a cross-sectional view of an example loudspeaker assembly.

Aspects and embodiments of the present invention will now be discussed with reference to the accompanying figures. Further aspects and embodiments will be apparent to those skilled in the art. All documents mentioned in this text are incorporated herein by reference.

In the examples that follow, alike features have been given corresponding reference numerals, and corresponding descriptions may apply except where such a description is clearly impermissible or expressly avoided.

FIG. 1*a* is a cross-sectional view of a loudspeaker assembly 100.

The loudspeaker assembly 100 comprises a loudspeaker 101, a rear enclosure 140, and a waveguide 150.

The loudspeaker 101 includes a diaphragm 110, a drive unit 120 and a drive unit frame 122.

The diaphragm 110 has a first radiating surface 112 for radiating sound in a forward direction F and a second radiating surface 114 for radiating sound in a rear direction R. The first radiating surface 112 and the second radiating surface 114 are located on opposite faces of the diaphragm 110. The diaphragm 110 is suspended from the drive unit frame 122 via two loudspeaker suspension elements 116, 118. The first drive unit suspension element 116 in this example is a damper (which may also be referred to as a "spider"). The second drive unit suspension element 118 in this example is a surround (which may also be referred to as a "roll suspension" or "roll edge"). A dust cap 111 is attached to the first radiating surface 112 of the diaphragm 110 to prevent dust or other foreign particles from getting into the drive unit 120.

The drive unit 120 is configured to move the diaphragm 110 based on an electrical signal received via a lead wire 126 and socket 148. In this example, the drive unit 120 is an electromechanical drive unit that includes a magnet unit 130 which is configured to produce a magnetic field in an air gap, and a voice coil 128 attached to the diaphragm 110 by a voice coil former 127. The voice coil 128 is configured to sit in the air gap when the diaphragm 110 is at rest. When the loudspeaker 101 is in use, the voice coil 128 is energized (e.g. by having the electrical signal pass through it) to produce a magnetic field which interacts with the magnetic field produced by the magnet unit 130. This causes the voice coil 128 (and therefore the diaphragm 110) to move relative to the magnet unit 130 along a movement axis 102 such that the first and second radiating surfaces 112, 114 radiate sound in the forward and rear directions respectively. The sound produced by the first radiating surface 112 is in antiphase with sound produced by the second radiating surface 114. In this case, the movement axis 102 is parallel to the forward direction F.

The rear enclosure 140 encloses a volume configured to receive sound produced by the second radiating surface 114. In this example, the rear enclosure 140 comprises a back plate 142, a front plate 146 and side walls 144 which surround the loudspeaker 101 and join the front plate 146 to the back plate 142. The side walls 144 of the rear enclosure 140 are self-supporting and made of regions of porous material which allow sound produced by the second radiating surface 114 to exit the loudspeaker assembly 100 through the side walls 144. The rear enclosure 140 is analogous to configuration B, discussed in more detail below.

The waveguide 150 is provided to direct sound produced by the first radiating surface 112 in the forward direction towards a mouth 154 of the waveguide 150. In this example, waveguide 150 is a conical horn mounted to the front plate 146 of the rear enclosure 140 and the mouth 154 is an opening at a distal end of the conical horn. Thus, sound radiated by the first radiating surface 112 can radiate out from the mouth 154 to the surrounding environment.

In this example, the waveguide 150 is made entirely of a self-supporting porous material. This configuration allows some sound produced by the first radiating surface 112 to exit the volume enclosed by the waveguide 150 via the porous material.

The porous material in the waveguide 150 has a specific airflow resistance in the range 500-5000 Pa·s/m, preferably 1000-2000 Pa·s/m, e.g. 1500 Pa·s/m. Suitable material for the porous material in the waveguide 150 which can be self-supporting and have a specific airflow resistance across these ranges of values include: felt, paper, an extra fine metal mesh, a dense woven fabric, or a micro perforated material.

The porous material in the rear enclosure 140 has a specific airflow resistance in the range 1000-10000 Pa·s/m, preferably 2000-4000 Pa·s/m, e.g. 3000 Pa·s/m. Suitable material for the porous material in the rear enclosure 140 that may have a specific airflow resistance across these ranges of values include: paper, felt, an extra fine metal mesh, a dense woven fabric, or a micro perforated material. As shown below with reference to FIG. 9*b* (configuration B), a loudspeaker having this construction has been found to have a very directive polar response over a wide frequency range.

Figure 1B:
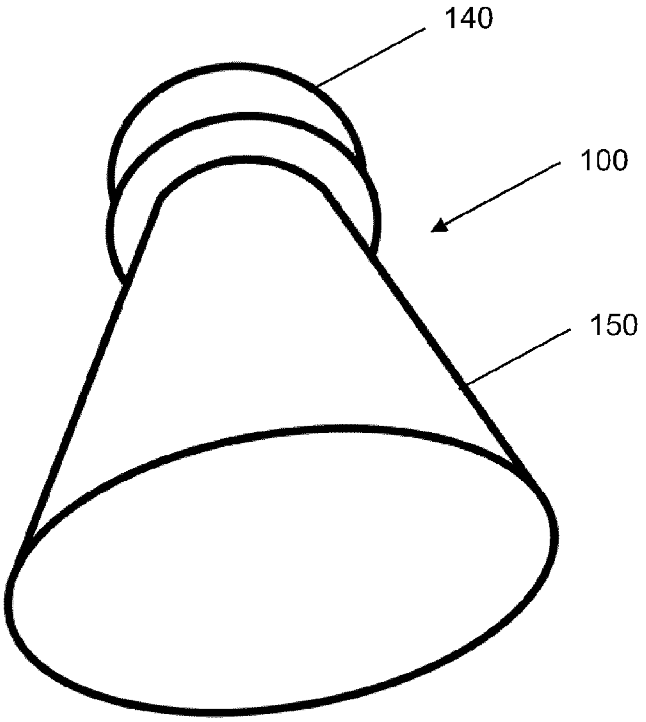
FIG. 1*b* shows a perspective view of the loudspeaker assembly of FIG. 1*a;*

FIG. 1*b* is a perspective view of the loudspeaker assembly 100 of FIG. 1*a* showing the loudspeaker assembly 100 from the outside.

Figure 1C:
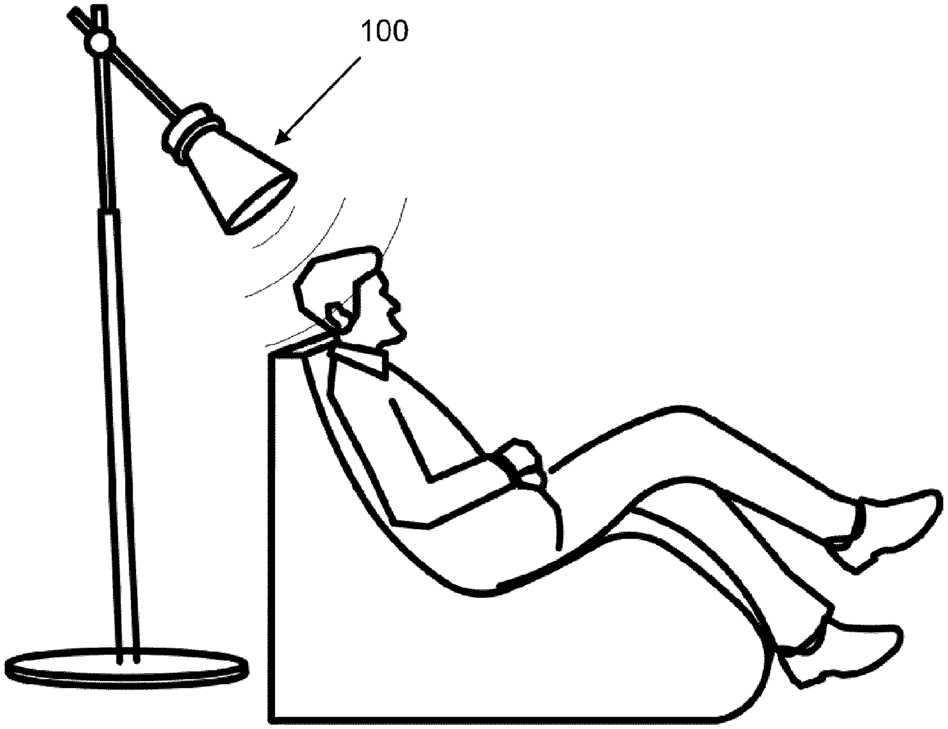
FIG. 1*c* shows an example use of the loudspeaker assembly of FIGS. 1*a* and 1*b;*

FIG. 1*c* shows an example use of the loudspeaker assembly of FIGS. 1*a* and 1*b*. Here the loudspeaker assembly 100 is mounted to a stand and configured to provide personal audio to a user.

Since the loudspeaker assembly 100 is intended to be used for personal sound reproduction it is likely to be used in proximity to the user. Therefore, only moderate volume levels are required. The maximum sound pressure level (SPL) achievable using a broadband loudspeaker is typically defined by the effective surface area of the diaphragm and the frequency range of interest (since the lowest frequencies require a larger diaphragm excursion). Since, the loudspeaker assembly is intended to be used near the ear, the excursions required from the diaphragm are small compared to for loudspeakers which are intended for listeners at greater distances. This is a beneficial side effect of a personal sound application since it allows for large corrections to be applied when tuning the loudspeaker using frequency band equalization (since the loudspeaker can operate far below its capabilities). This effect is particularly useful at low frequencies, since a large amount of amplitude correction may be applied by using the extra excursion available to the diaphragm. For instance, corrections of more than 20 dB for low frequencies may be applied to ensure the resulting audio spectrum follows the contours that define the typical human hearing threshold, known as the Fletcher and Munson curves. In this way, the useful frequency range of the loudspeaker may be extended to lower frequencies. Thus, the loudspeaker assembly can achieve audiophile standards of sound reproduction, even when using a diaphragm with a small effective radiating surface, while minimising disturbance to other people in the same room.

Figure 1D:
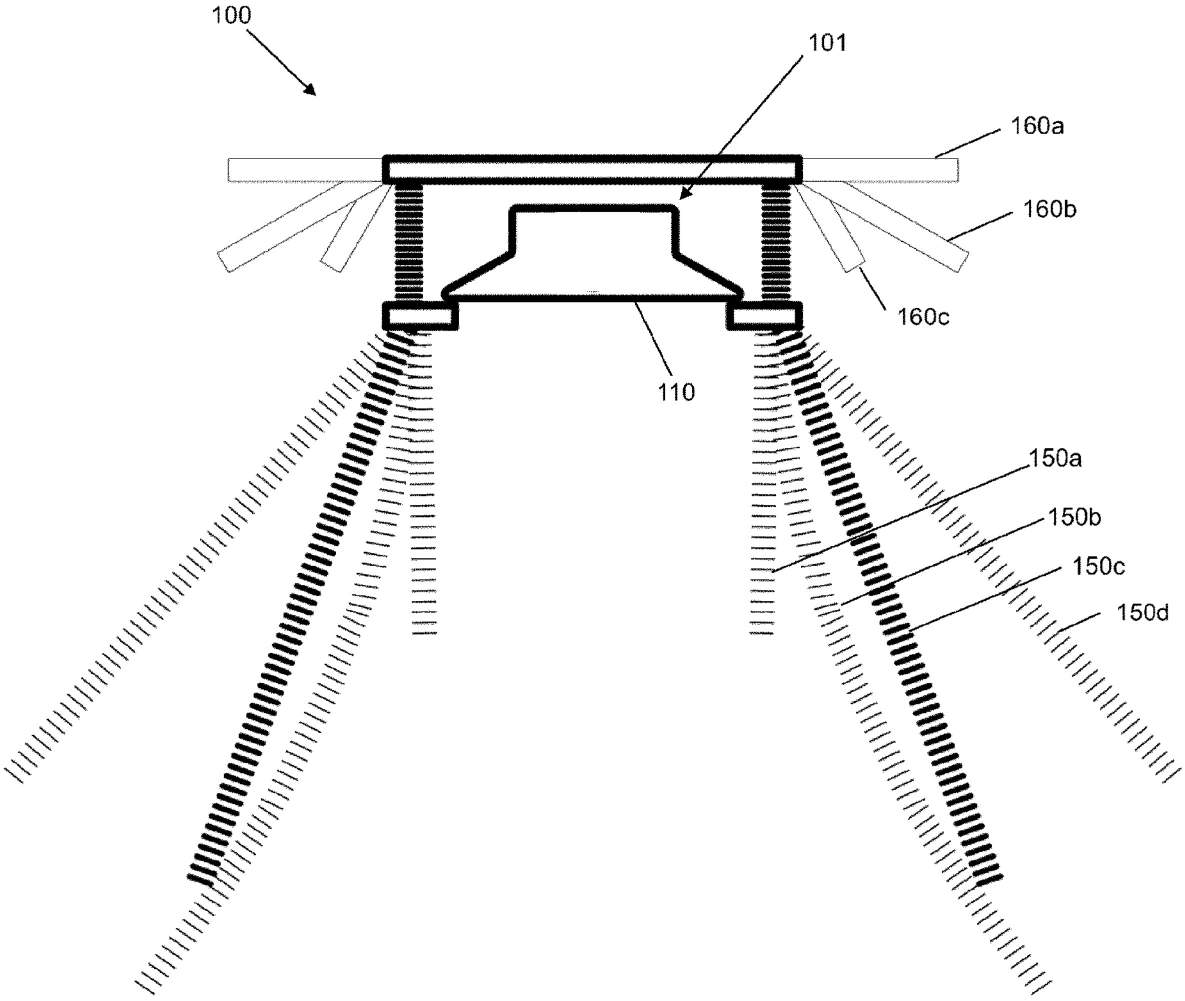
FIG. 1*d* shows a cross-sectional view of the loudspeaker assembly of FIGS. 1*a* to 1*c* with alternative configurations for the waveguide.

FIG. 1*d* shows a cross-sectional view of a variation of the loudspeaker assembly 100 of FIG. 1*a* which has wings 160*a-c* mounted to the rear enclosure 140 behind the waveguide 150. The wings 160*a-c* project outwardly from the remainder of the loudspeaker assembly 100 a lateral direction.

As discussed above, the wings 160*a-c* may help to reduce sound leakage and improve the overall directionality of the loudspeaker assembly 100. Three alternative configurations of wings 160*a-c* are shown which have different lengths and are mounted to the rear enclosure 140 at various angles. These properties may be adjusted to suit a chosen application.

In some examples, the wings 160*a-c* are made from a porous material of suitable acoustic resistivity (defined by the specific airflow resistance of the material), similar to the porous material incorporated in the rear enclosure 140 and the waveguide 150 and thus may be referred to as "absorber" wings.

In other examples, the wings 160*a-c* may be made of a non-porous material and may thus be referred to as "reflector" wings FIG. 1*d* also shows four optional configurations of waveguide 150*a*-150*d* wherein the walls of the waveguide form different shapes, lengths, and/or diverging angles. As shown here, the waveguide 150 shape and length can be adjusted to improve the directionality of the loudspeaker assembly 100 (for example as discussed below in relation to FIGS. 11*a* and 12*a*) or to better suit a chosen application (for example as discussed below in relation to a headrest assembly 600 in FIG. 6*a*).

Further examples will now be discussed, with corresponding features given alike reference numerals.

Figure 2:
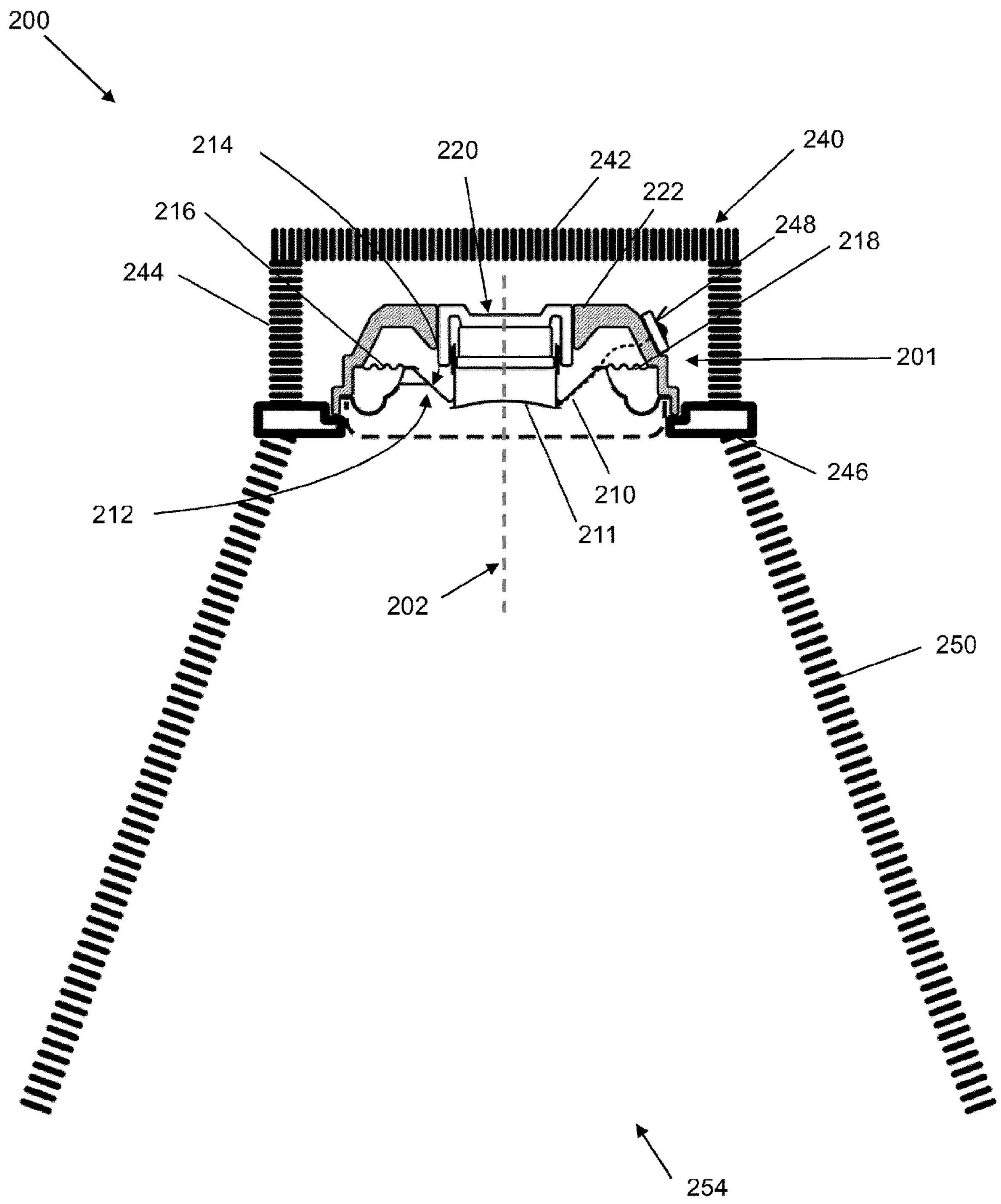
FIG. 2 shows a cross-sectional view of another example loudspeaker assembly.

FIG. 2 is a cross-sectional view of an alternative loudspeaker assembly 200. In this example, the side walls 244 and back plate 242 of the rear enclosure 240 are self-supporting and made of a porous material. Thus the entire rear enclosure 240 is self-supporting and made of a porous material.

This allows sound produced by the second radiating surface 214 to exit the loudspeaker assembly 200 through the side walls 244 and the back plate 242 (analogous to configuration C, discussed in more detail below).

A suitable material for the porous material in the rear enclosure 240 which can be self-supporting and have a specific airflow resistance across in an above suggested range (e.g. 1000-10000 Pa·s/m, preferably 2000-4000 Pa·s/m, e.g. 3000 Pa·s/m) is felt or paper.

Figure 3:
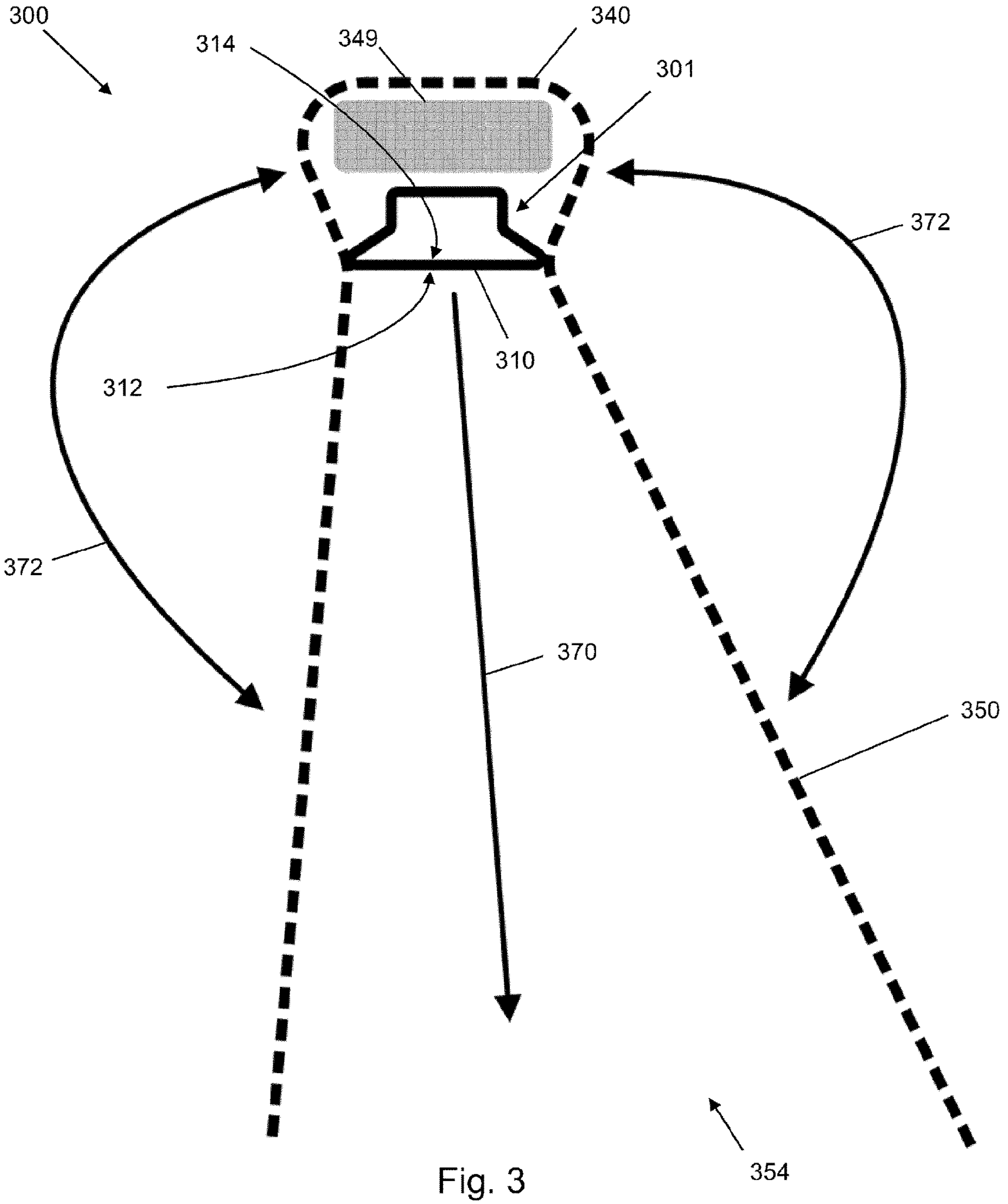
FIG. 3 shows a cross-sectional view of another example loudspeaker assembly.

FIG. 3 shows a cross-sectional view of another example loudspeaker assembly 300. In this example the rear enclosure 340, which is a dome shape, and the waveguide 350 are part of the same structure which is self-supporting and made of a porous material. The loudspeaker 301 is shown here only in figurative form. There is a lack of a dividing component between the rear enclosure 340 and waveguide 350 in this example, which helps to ensure there is less obstruction in the interaction path 372 between the sound produced by the first radiating surface 312 the sound produced by the second radiating surface 314. By shortening the interaction path 372 between sound being produced by the first and second radiating surfaces 312, 314, the cancellation effect described above may be improved resulting in better directionality of the loudspeaker assembly 300.

An additional region of porous material 349 is included in the rear enclosure 340 to increase the absorption of high frequency sound received from the second radiating surface 314. The porosity of this additional region of porous material may be adjusted to control the amount of acoustic resistivity/specific airflow that it introduces to the path of the sound being produced by the second radiating surface 314.

Figure 4:
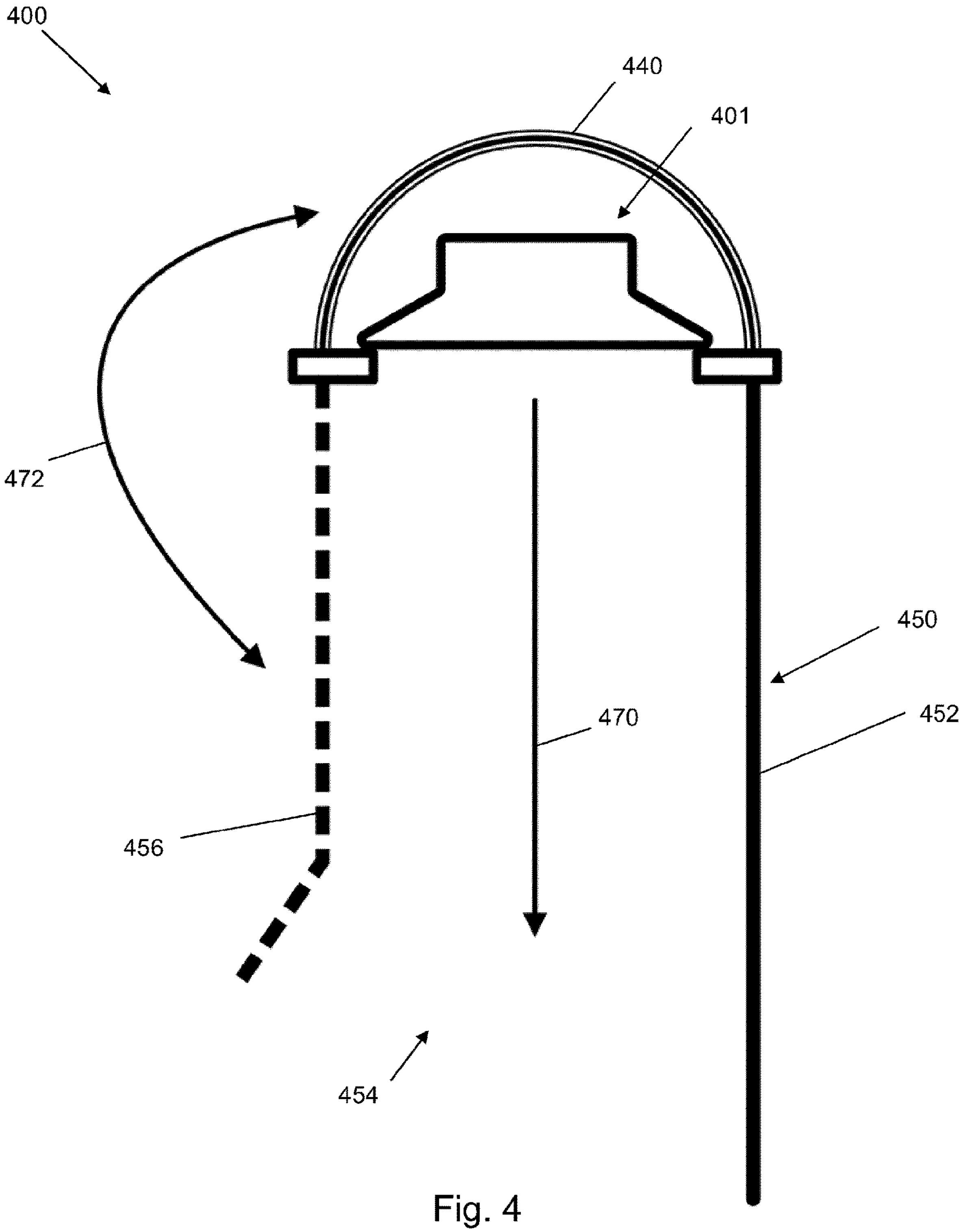
FIG. 4 shows a cross-sectional view of another example loudspeaker assembly.

FIG. 4 shows a cross-sectional view of another example loudspeaker assembly 400 wherein the waveguide 450 comprises a vertical side 452, which is non-porous and perpendicular to the first radiating surface, and a diverging side 456 which is porous and diverges at the end closest to the mouth 454 of the waveguide 450. Therefore, the interaction path 472, and hence cancellation, between the sound received from the first radiating surface and the sound received from the second radiating surface is limited to the side of the loudspeaker assembly 400 which has the region of porous material in the waveguide 450. This structural configuration may provide benefit to a user as the flat side can be mounted to a wall or arranged flush to another component, while still providing highly directional sound, which could e.g. be useful if the loudspeaker assembly is to be incorporated into a headrest, e.g. as described below.

Figure 5A:
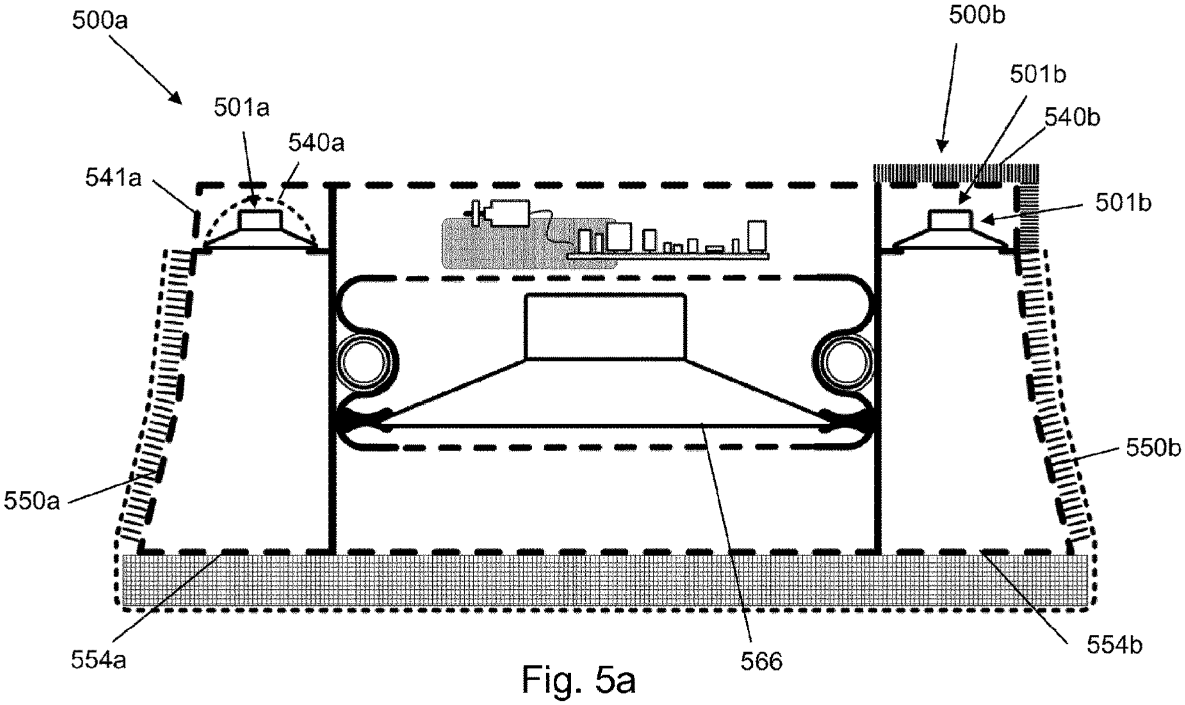
FIGS. 5*a*-5*c* show an example loudspeaker assembly wherein the loudspeaker is incorporated in a headrest.
Figure 5B:
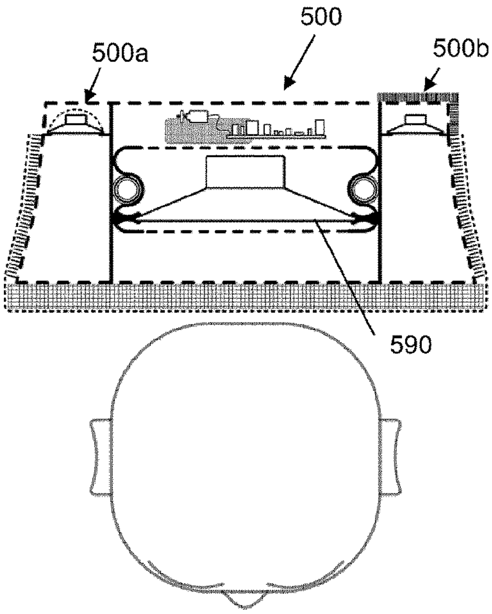
Figure 5C:
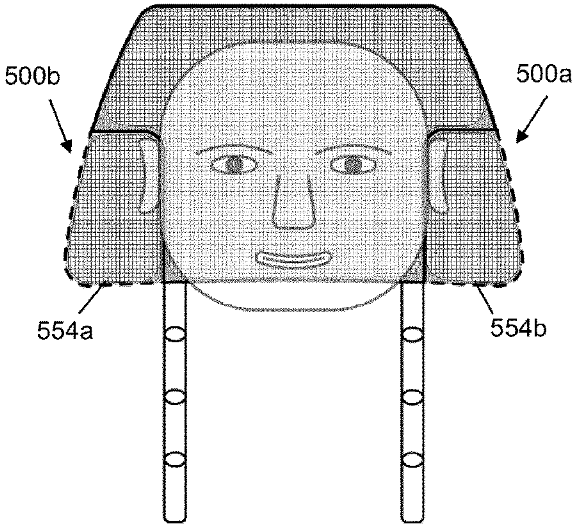

FIGS. 5*a-c* show a headrest which includes two example loudspeaker assemblies 500*a*, 500*b* according to the first aspect of the present invention. First and second loudspeakers 501*a*, 501*b* are positioned on either side of an additional, bass loudspeaker 566 (shown figuratively here, but which may for example be as described in WO2019121266 or WO/2022/048810. The loudspeakers 501*a*, 501*b* are directed towards the area where a user's head would be positioned. As discussed above, this arrangement is well-suited to producing personal sound which is high-quality and easy to hear from the perspective of the user of the headrest, but difficult to hear from the perspective of people not using the headrest.

The first loudspeaker 501*a* is mounted at the back of the headrest such that the first radiating surface of the diaphragm radiates sound towards a user's head positioned in-front of the headrest. The inner contours of the headrest form a waveguide 550*a* for directing sound produced by the first radiating surface towards the mouth 554*a* of the waveguide 550*a*. The mouth 554 is covered by a material of the headrest which is substantially transparent to sound. The external walls of the headrest that form the waveguide 550*a* comprise a porous material which allows some of the sound radiated by the first radiating surface of the diaphragm to pass therethrough. The porous material has a specific airflow resistance of 500-5000 Pa·s/m such that the sound passing therethrough encounters some acoustic resistance.

A rear enclosure 540*a* surrounds the first loudspeaker 501*a* which is internal to the headrest. In this example, the rear enclosure 540*a* is made from a self-supporting porous material having a specific airflow resistance of 1000-10000 Pa·s/m. Thus, sound produced by the second radiating surface of the loudspeaker encounters some acoustic resistance as it exits the rear enclosure 540*a* where it interacts with sound produced by the first radiating surface passing through the porous material of the waveguide 550*a*. Accordingly, the external walls 541*a* of the headrest which surround the rear enclosure 540*a* are covered with a material which is substantially acoustically transparent.

The second loudspeaker 501*b* is also mounted at the back of the headrest. A second waveguide 550*b* is formed by the inner contours of the headrest in a similar manner to the first waveguide 550*a*.

A second rear enclosure 540*b* is formed around the second loudspeaker 501*b*. But in this example, the loudspeaker 501*b* has no separate rear enclosure 540*b*. Instead the rear enclosure 540*b* is formed by the material of the headrest and which is made of a porous material having a suitable acoustic resistance (i.e. by using a porous material with a specific airflow resistance in the range 1000-10000 Pa·s/m).

Figure 6A:
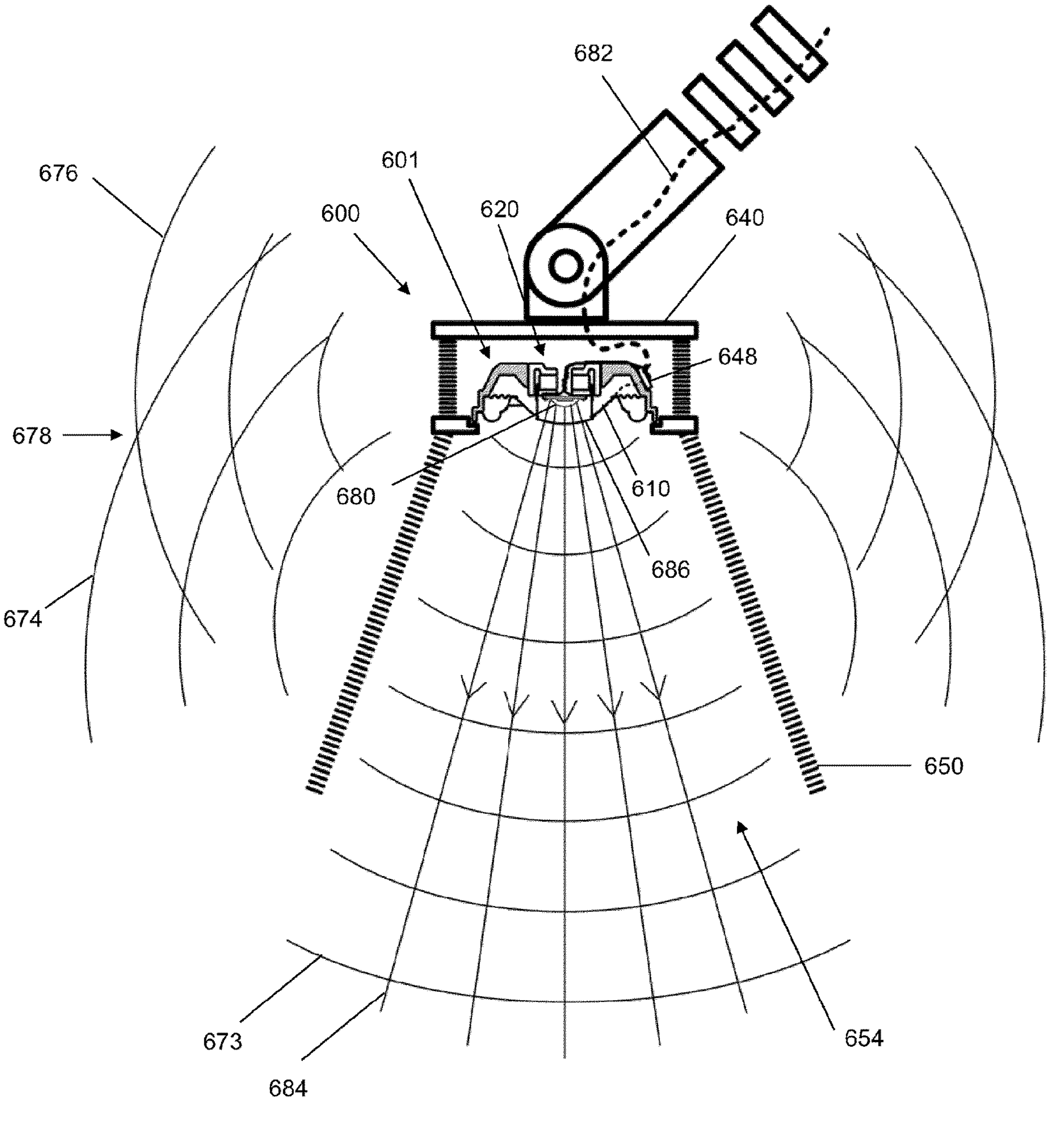
FIG. 6*a*-*b* show cross-sectional views of an example loudspeaker assembly wherein an LED is incorporated in the loudspeaker.

FIG. 6*a* shows a cross-sectional view of an example loudspeaker assembly 600 wherein an LED 680 is incorporated in the loudspeaker 601. Thus, the loudspeaker assembly 600 functions as a speaker and a lamp wherein the waveguide 650 functions as an acoustic waveguide to direct sound waves 673 and a lamp shade to direct light rays 684.

In this example, the LED 680 is a Chip-on-Board (COB) LED mounted inside the loudspeaker 601 and is configured to emit light rays 684 which pass through a transparent dust cap 686 towards the mouth 654 of the waveguide 650. Power is provided to the drive unit and to the LED 680 via a cable 682 and socket 648.

In this example, the waveguide 650 and side walls of the rear enclosure 640 are self-supporting and entirely made of a porous material with suitable acoustic resistivity, similar to the loudspeaker assembly 100 of FIG. 1*a*. Therefore, sound 674 exiting the waveguide 650 and sound exiting the rear enclosure 676 meet in interaction zone 678 at the sides of the loudspeaker assembly 600 resulting in the cancelling effect described above.

Figure 6B:
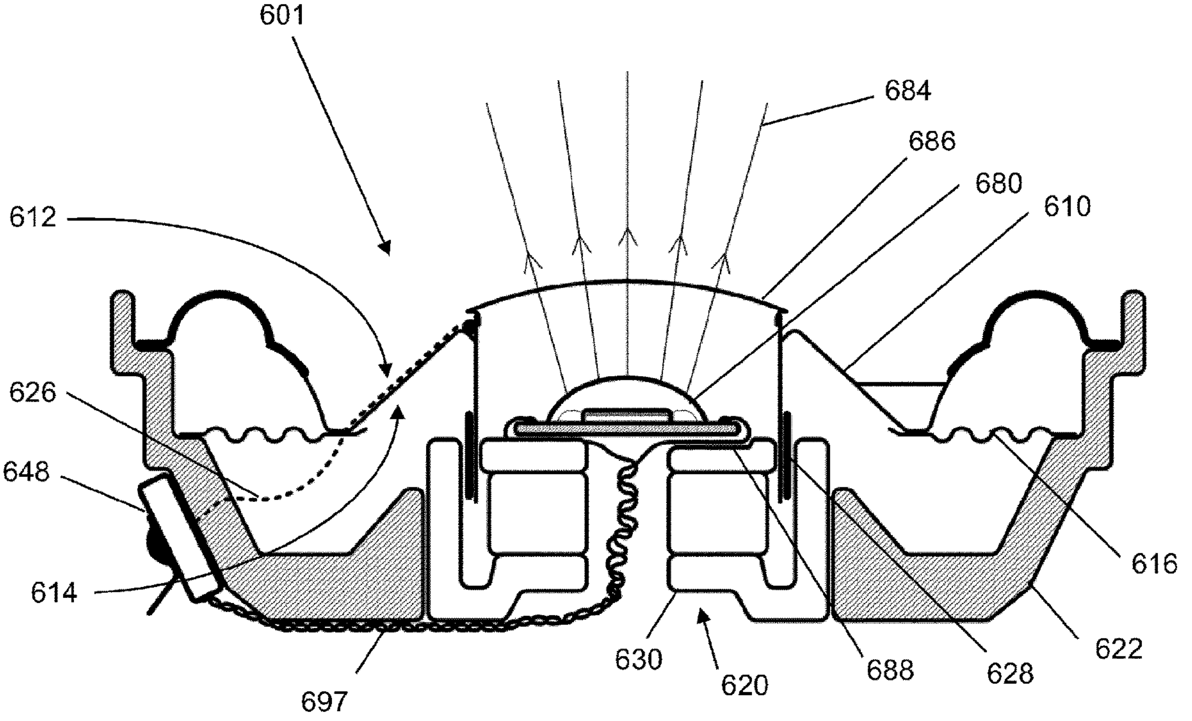

FIG. 6*b* shows a cross-sectional view of the loudspeaker 601 from FIG. 6*a*. The loudspeaker 601 comprises a drive unit 620, diaphragm 610, and voice coil 628 and operates in the same way as the loudspeaker 101 described for FIG. 1*a*. The LED 680 is mounted on the core of the drive unit 620 in a recess 688 which is provided in a washer of the magnet assembly 630. Power is provided to the LED 680 via the socket 648 and a wire 697 which is fed through a hole in the centre of the magnet assembly 630. The LED 680 is attached to the magnet assembly 630 using heat conductive glue. Thus, the metal magnet assembly of the drive unit acts as a heatsink.

The transparent dust cap 686 is positioned in a forward-facing surface of the loudspeaker 601 and is configured to allow light rays 684 produced by the LED 680 to pass therethrough.

Figure 7:
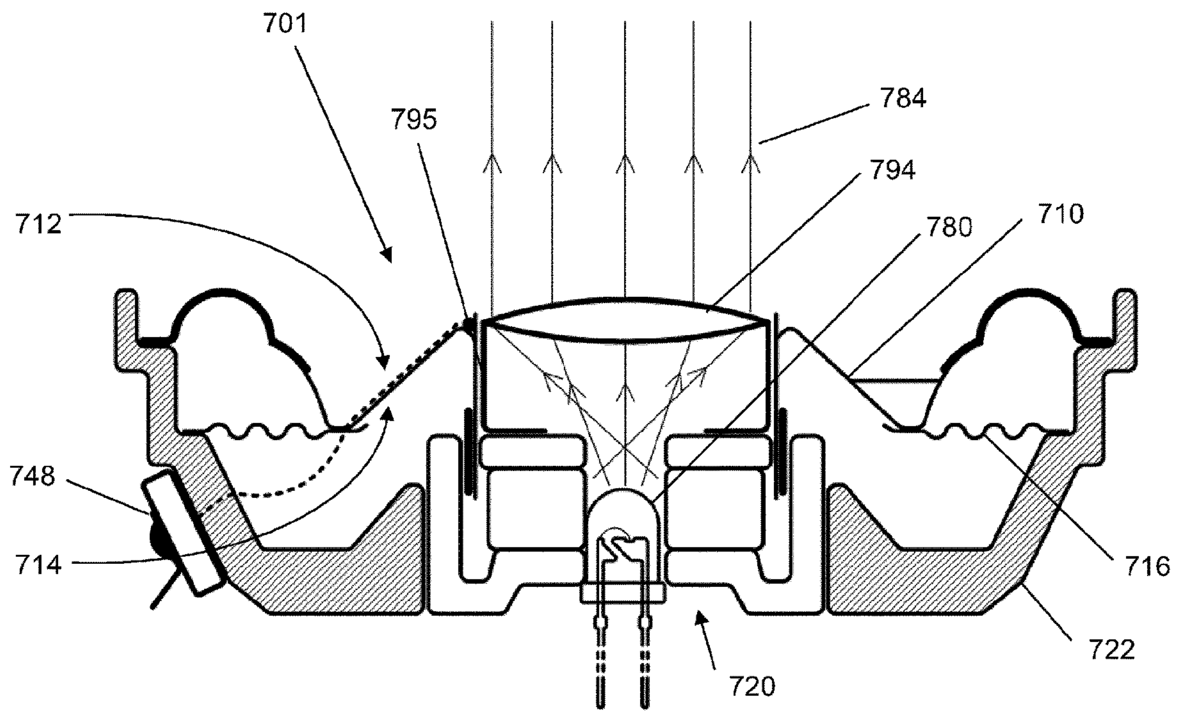
FIG. 7 shows a cross-sectional view of another example loudspeaker assembly incorporating an LED.

FIG. 7 shows a cross-sectional view of another example loudspeaker 701 incorporating an LED 780. In this example, the LED 780 is a traditional DIP LED mounted inside a magnetic core of the drive unit 720. A lens 794 is mounted to the magnet assembly, on legs 795, which is configured to direct light produced by the LED 780 towards the mouth of the waveguide (not shown). This lens, which also serves to transmit sound waves from the loudspeaker to the waveguide beyond, may also be configured to act as a phase plug.

Figure 8:
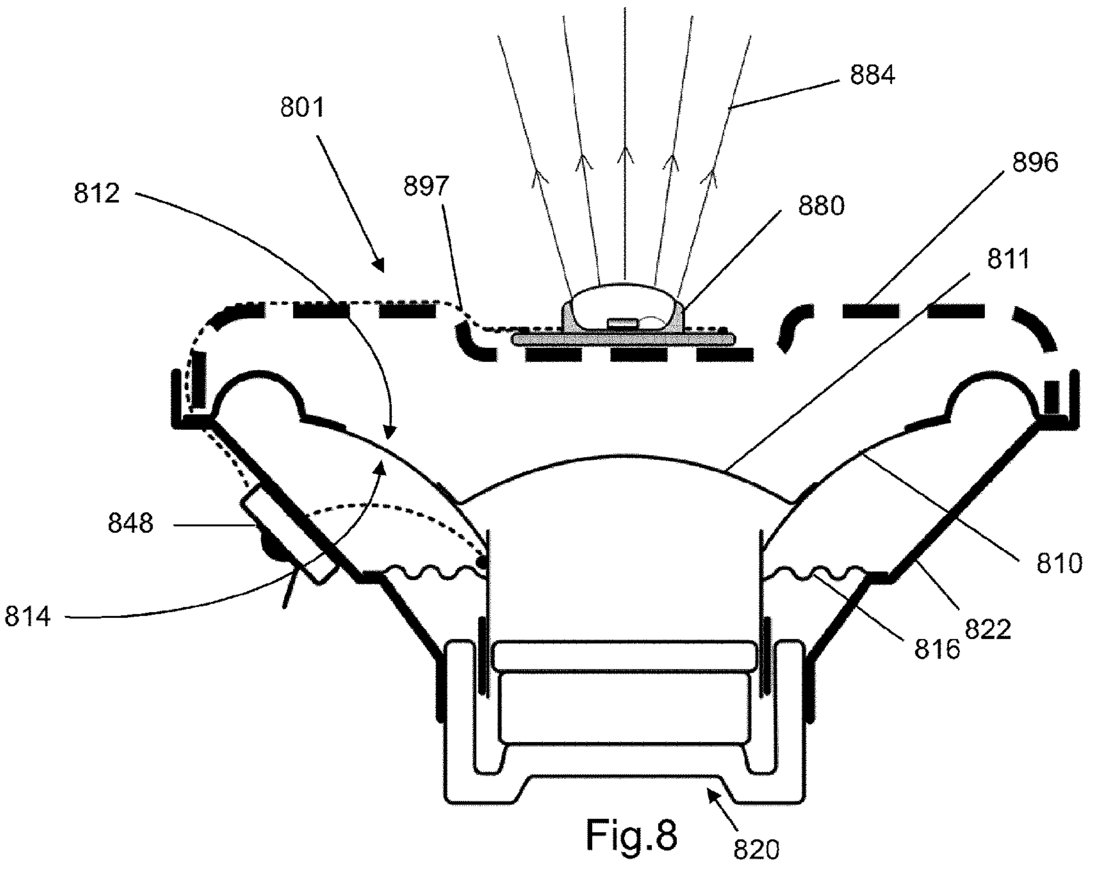
FIG. 8 shows a cross-sectional view of another example loudspeaker assembly incorporating an LED.

FIG. 8 shows a cross-sectional view of another example loudspeaker 801 incorporating an LED 880. The loudspeaker 801 is a typical loudspeaker as seen in FIG. 1*a*, with an acoustically transparent grille 896 provided in front of the first radiating surface 812 of the diaphragm 810 and the dust cap 811. The LED 880 is an SMD LED mounted on the grille 896 where it receives power from a wire 897 which is fed around the outside of the grille 896 from the socket 848.

Figure 9:
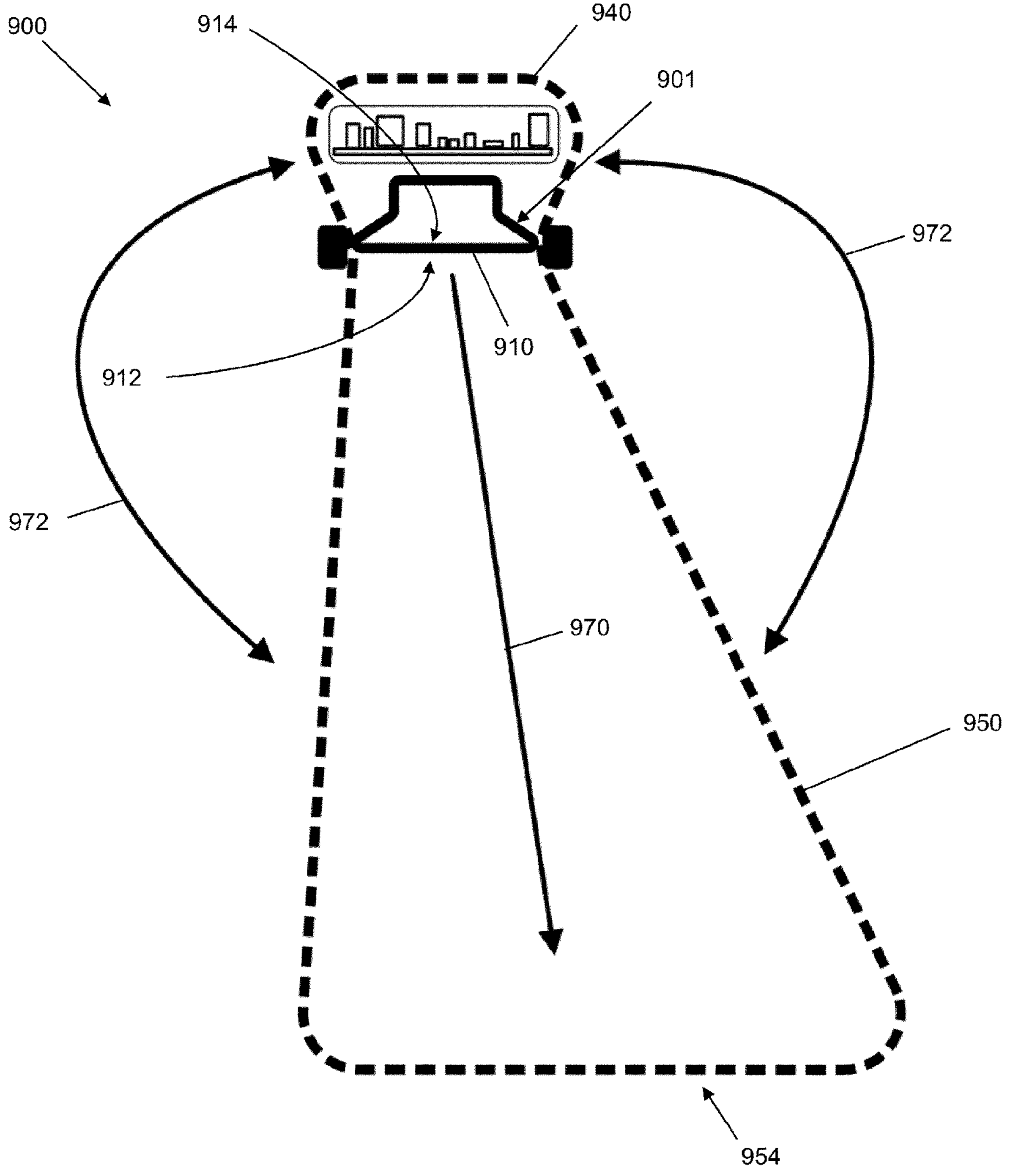
FIG. 9 shows a cross-sectional view of another example loudspeaker assembly.

FIG. 9 shows a cross-sectional view of another example loudspeaker assembly 900. In this example the rear enclosure 940, which is a dome shape, and the walls of the waveguide 950 are part of the same structure which is self-supporting and made of a porous material. In addition, the mouth 954 of the waveguide is covered by a porous material. In this example, the rear enclosure 940, the walls of the waveguide 950, and the mouth 954 of the waveguide are covered by the same piece of porous material.

The walls of the waveguide 950 are configured to direct some of the sound produced by the first radiating surface 912 of the diaphragm towards the mouth 954 along direction 970 and to allow the remainder of the sound produced by the first radiating surface 912 to exit the waveguide via the regions of porous material in the walls of the waveguide 950. The portion of the sound directed towards the mouth 954 may then exit the waveguide 950 via the region of porous material covering the mouth 954. The portion of the sound exiting the waveguide 950 via the regions of porous material in the walls of the waveguide may interact at the sides 972 of the loudspeaker assembly with sound produced by the second radiating surface 914 of the diaphragm which has exited the rear enclosure 940 via the regions of porous material covering the rear enclosure 940.

Figure 10:
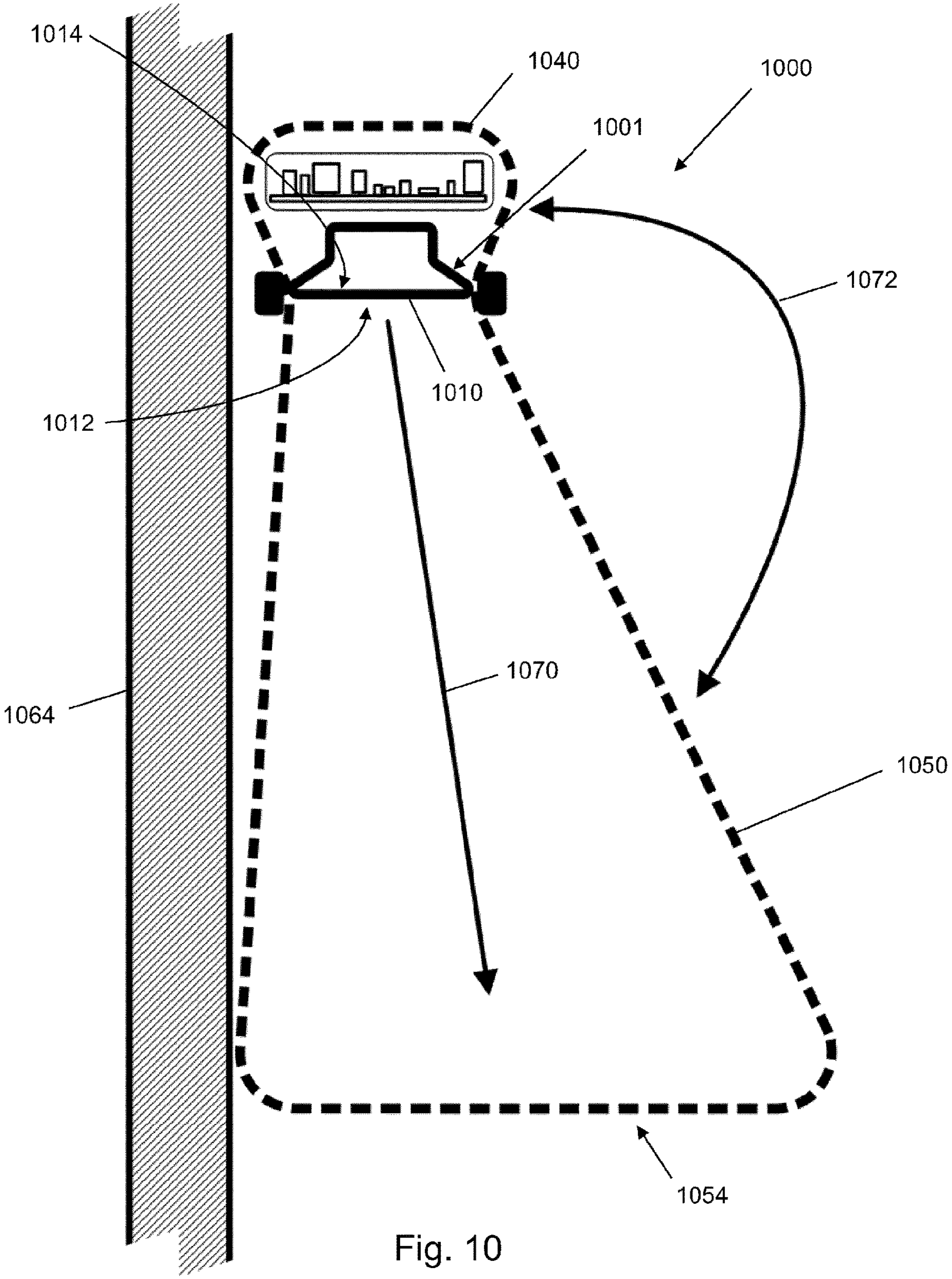
FIG. 10 shows a cross-sectional view of another example loudspeaker assembly.

FIG. 10 shows a cross-sectional view of another example loudspeaker assembly 1000. In this example, the loudspeaker assembly 1000 is the same as the loudspeaker assembly 900 of FIG. 9 but is mounted next to a wall 1064. The wall 1064 is configured to reflect sound back towards the region of space containing the loudspeaker. Therefore, in this example the sound exiting the walls of the waveguide 1050 and the sound exiting the rear enclosure 1040 are shown as interacting at only one side 1072 of the loudspeaker assembly 1000. Of course, the skilled person would understand that the sound would also interact at in regions surrounding the loudspeaker assembly 1000 where the wall 1062 is not present (e.g. in regions of space which are into and out of the page). As discussed below in relation to FIGS. 18-23, the wall 1064 helps to improve the directivity performance of the loudspeaker assembly 1000.

Figure 11:
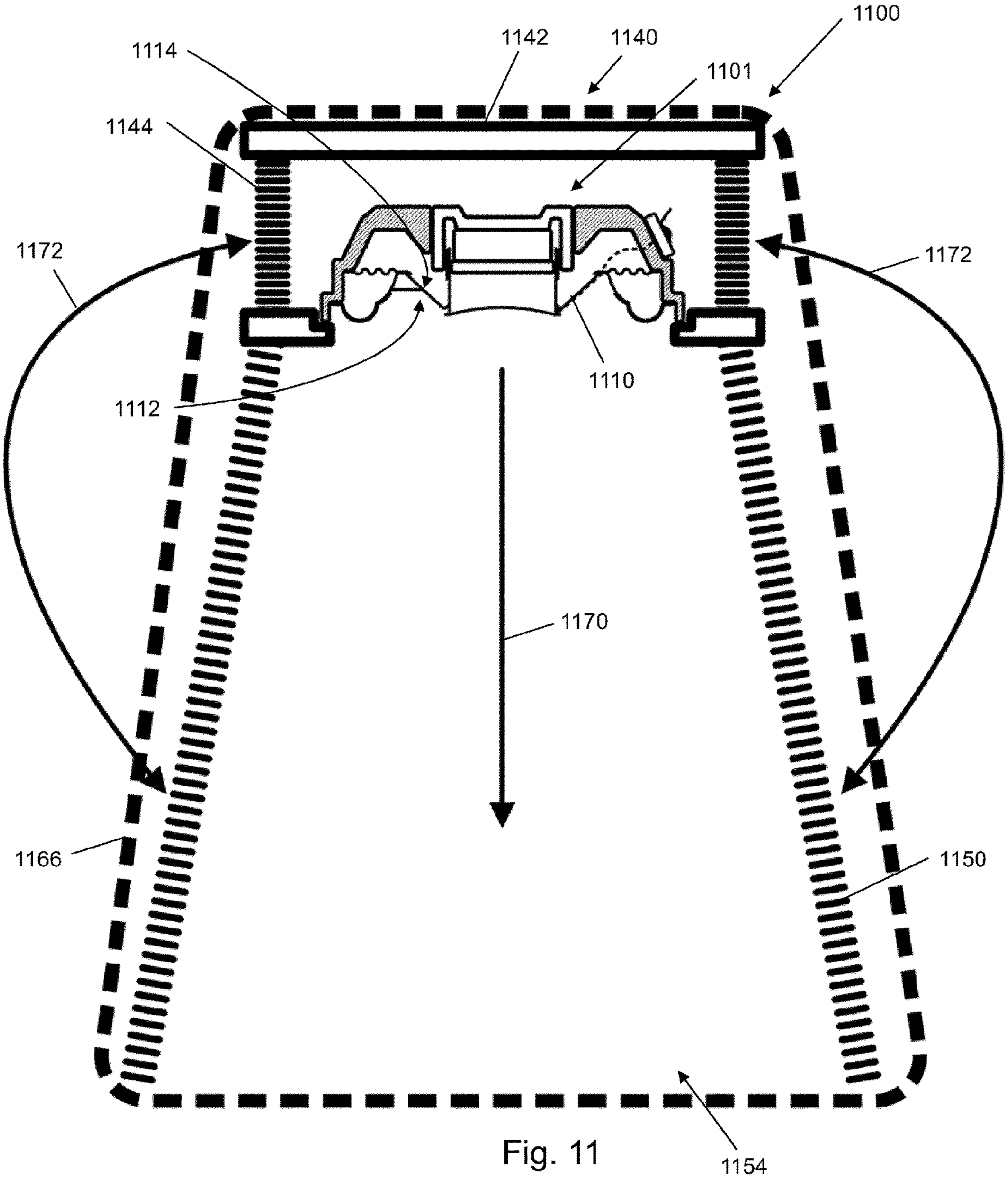
FIG. 11 shows a cross-sectional view of another example loudspeaker assembly.

FIG. 11 shows a cross-sectional view of another example loudspeaker assembly 1100 wherein the rear enclosure 1140, the waveguide 1150 and the mouth 1154 of the waveguide are enclosed by an outer shell 1166. The outer shell 1166 is formed from a perforated protective casing which is covered by a porous textile. The acoustic resistivity of the outer shell 1166 may be considered as providing additional acoustic resistivity to the regions of porous material in the waveguide 1150 and in the rear enclosure 1140. The outer shell 1166 is configured such that sound exiting the waveguide 1150 via the regions of porous material in the waveguide 1050 and the sound exiting the rear enclosure 1140 via the regions of porous material in the rear enclosure 1140 also exits the outer shell 1166, along directions 1172, where the sound exiting the waveguide 1050 and the sound exiting the rear enclosure 1040 may interact to produce a useful cancellation effect.

Simulations and Experiments

FEM (finite element methods) were used to simulate different loudspeaker assembly configurations to inform the present invention. Here, unless otherwise stated, SPL (sound pressure level) was calculated using FEM at a distance of 1m from the diaphragm of the loudspeaker assembly being assessed. For actual prototypes, SPL was measured experimentally at a distance of 1m from the diaphragm of the loudspeaker assembly being assessed.

Polar responses were calculated showing the SPL values at different locations around the loudspeaker. The polar responses are "normalized" polar responses where the response at 0° is a reference level to which the other angles of the polar response are evaluated. The centre of rotation for the polar plots is the centre of the diaphragm of the loudspeaker.

Figure 12A:
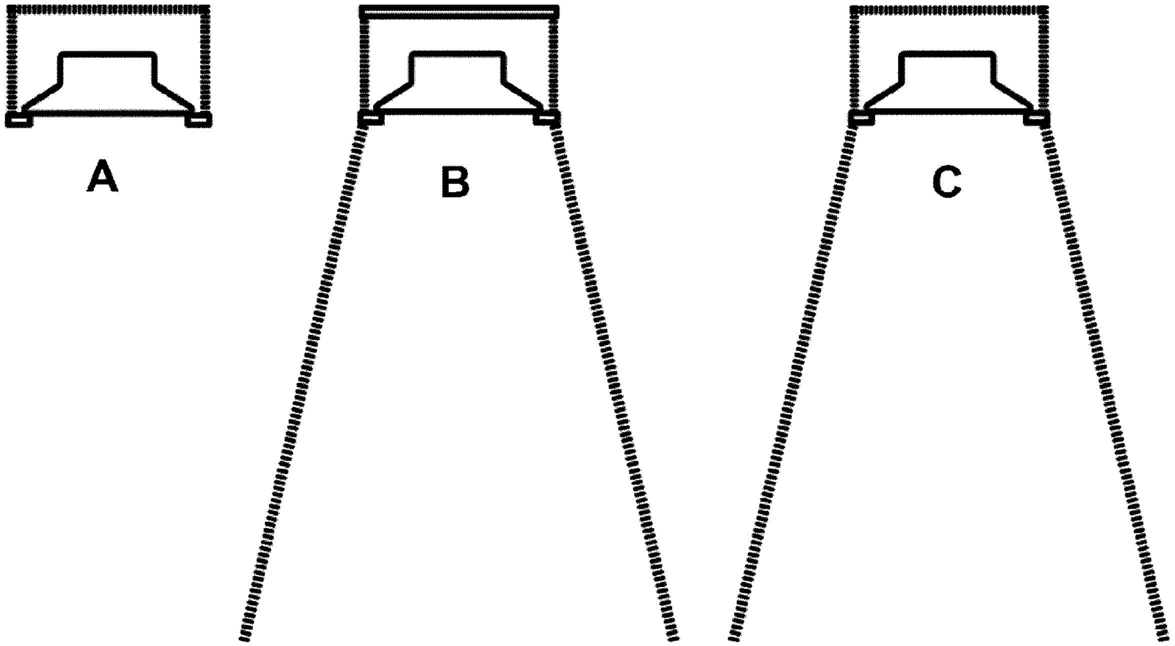
FIG. 12*a* shows cross-sectional views of three different loudspeaker assemblies (configurations A-C)

FIG. 12*a* shows cross-sectional views of three configurations of loudspeaker assemblies (configurations A-C).

Configuration A represents a loudspeaker enclosed by a rear enclosure that is made entirely from a porous material having a specific airflow resistance of 1500 Pa·s/m. The diaphragm of the loudspeaker has an effective diameter of 5 cm. There is no waveguide provided at the front of the loudspeaker assembly.

Configuration B represents a loudspeaker assembly according to the present invention. The diaphragm has an effective diameter of 5 cm and the loudspeaker is housed in a rear enclosure with a back plate which is non-porous. The sides of the enclosure are made of a porous material which is self-supporting and has a specific air flow resistance of 3000 Pa·s/m. A conical waveguide (which may also be referred to as a horn section) is attached to the front plate of the rear enclosure, in-front of the loudspeaker. The horn section is made entirely of a porous material having a specific airflow resistance of 1500 Pa·s/m. The height of the horn section is 15 cm and the mouth of the horn has a diameter of 12 cm.

Configuration C represents another loudspeaker assembly according to the present invention. Configuration C is the same as configuration B, except the rear enclosure is made entirely from a porous material which is self-supporting and which has a specific airflow resistance of 3000 Pa·s/m.

Figure 12B:
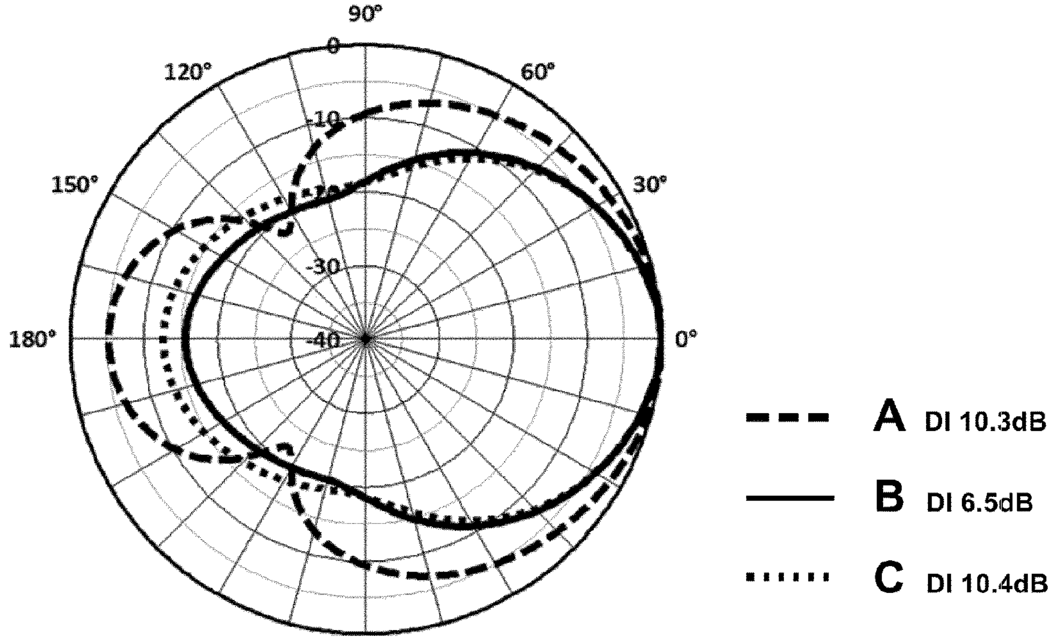
FIG. 12*b* shows computer simulated polar plots of broadband SPL responses and directivity indices for each of the loudspeaker assemblies of FIG. 12*a;*
Figure 13A:
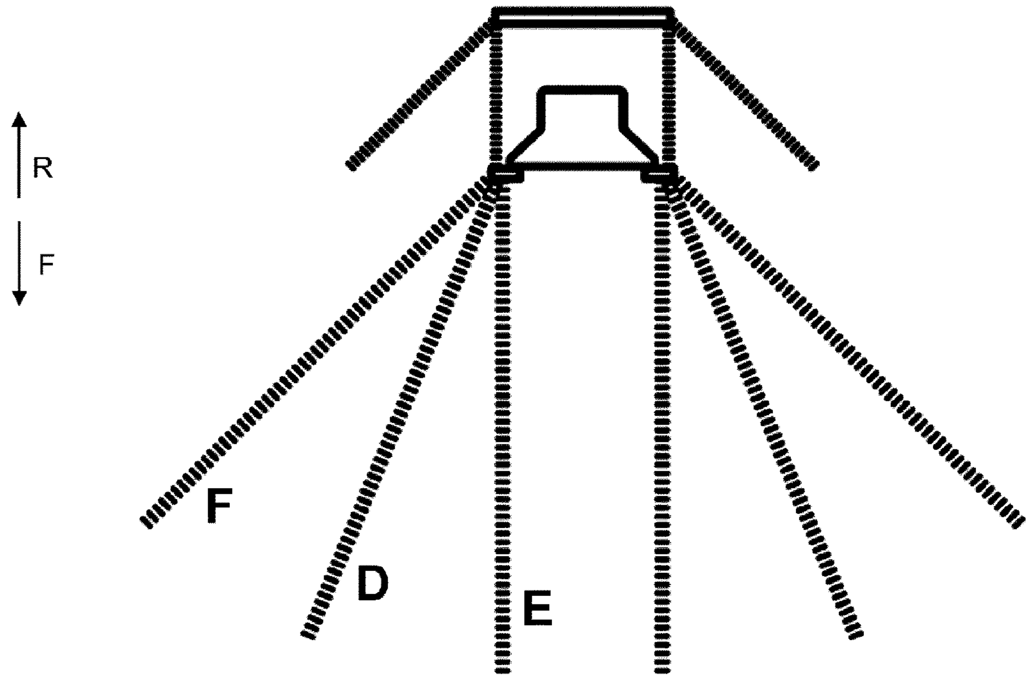
FIG. 13*a* shows a cross-sectional view of another example loudspeaker assembly with three example waveguide configurations (configurations D-F)

FIG. 12*b* shows a computer simulated polar plot of broadband SPL responses for each of the loudspeaker configurations shown in FIG. 13*a*. The SPL responses plotted in FIG. 12*b* were averaged over a broad frequency spectrum from 100 Hz to 10 kHz. This makes it easier to compare different loudspeaker assemblies across a wide frequency range.

The simulated polar plot is accompanied by directivity indices for each of the loudspeaker assemblies (denoted by "DI" in the Figures). The directivity indices give an overall indication of how directive the sound produced by each loudspeaker assembly may be, where a higher directivity index represents better performance in terms of sound directivity.

The directivity index, expressed in decibels, is calculated according to (as discussed in Leo L. Beranek, Tim J. Mellow, in Acoustics: Sound Fields and Transducers, 2012):

$$DI = 10\log_{10} Q(f) = 10\log_{10}\frac{4\pi p_{rms}^2(0)}{2\pi\int_0^{\pi} p_{rms}^2(\theta)\sin(\theta)\,d\theta}$$

where Q(f) is a directivity factor. The directivity factor Q(f) is the ratio of the intensity on a designated axis of a sound radiator at a stated distance to the intensity that would be produced at the same position by a point source if it were radiating the same total acoustic power as the radiator. Accordingly, $p_{rms}(0)$ is a measured or simulated reference pressure at 0°, and $p_{rms}(\theta)$ is the respective measured or simulated pressures at each angle, θ, around the sound radiator. Free space is assumed for the measurements.

Practically this means, when considering a symmetric device (as is the case for all of the following simulations and prototype), performing measurements or simulations of the sound pressure level at every angle between 0° and 180° (0 and π) from the diaphragm. A suitable resolution was chosen by performing measurements at angle intervals equal to or smaller than 10°.

FIG. 12*b* shows that configurations B and C are quite close to each other in terms of performance, with directivity indices of 10.3 dB and 10.4 dB respectively. In contrast, configuration A produces a significant amount of radiation (+10 dB) in the sideways direction (i.e. at 90 degrees) due to its lack of a waveguide. As a result, configuration A has a lower directivity index of 6.5 dB.

FIG. 13*a* is a cross-sectional view of another example loudspeaker assembly with three example waveguide configurations (D-F). A rear enclosure surrounds the loudspeaker which has a backplate made of a hard, non-porous material, and sides which are made of a porous material having a specific air flow resistance of 3000 Pa·s/m. In this example, the effective diameter of the loudspeaker's diaphragm is 3.2 cm. In this example, absorber wings are mounted, at an angle of 45° relative to the forward direction F (which in this example is also parallel to the movement axis of the loudspeaker), to the rear enclosure and are the same height as the rear enclosure. The reflector/absorber wings are also made of a material having a specific airflow resistance of 3000 Pa·s/m.

The three example waveguide configurations D-F are self-supporting conical horns made from a porous material which has a specific airflow resistance of 1500 Pa·s/m. The wall length of the waveguides are shorter than for configurations A-C at 10 cm for all three configurations D-F. The opening angle of the conical horn waveguides (relative to the forward direction F) is 0° for configuration E, 22.5° for configuration D, and 45° for configuration F.

Figure 13B:
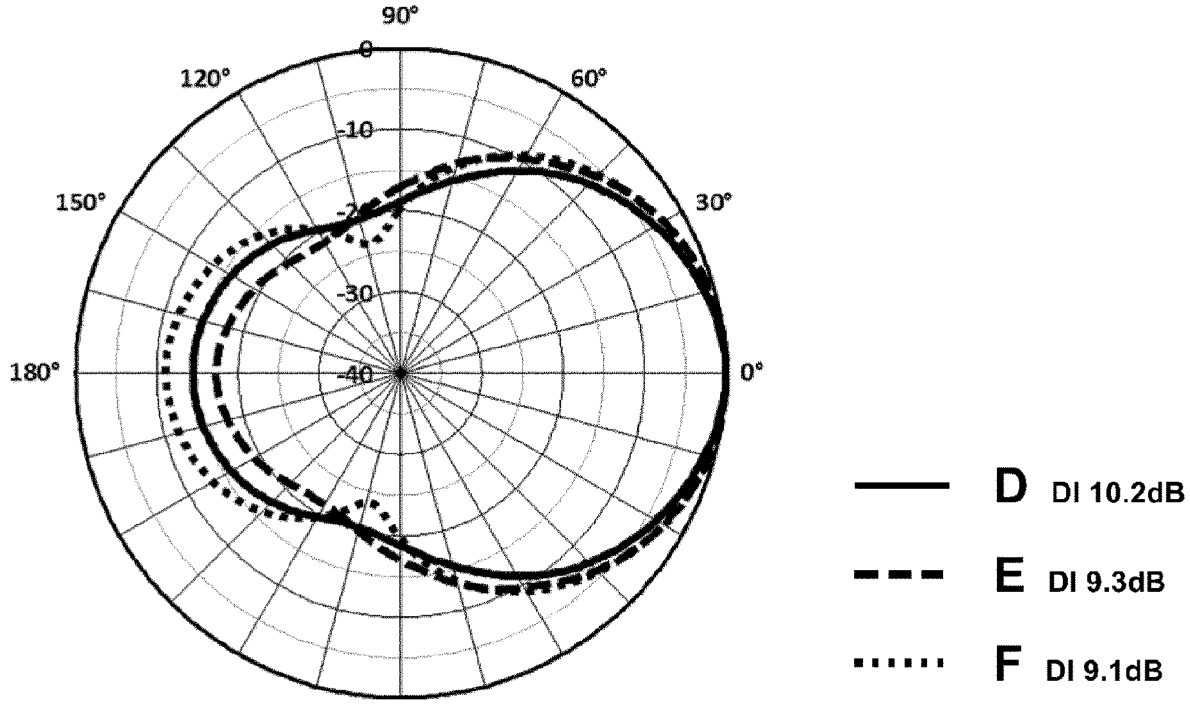
FIG. 13*b* shows computer simulated polar plots of broadband SPL responses and directivity indices for each of the waveguide configurations of FIG. 13*a;*

FIG. 13*b* shows a computer simulated polar plot of broadband SPL responses and directivity indices for each of the waveguide configurations of FIG. 13*a*. All three waveguide configurations show good performance in terms of sound directivity indicating that good performance may be achieved with a variety of waveguide shapes. However, the directivity indices indicate that configuration D (with an opening angle of) 22.5° represents a slight improvement compared to configurations E and F in terms of directivity.

Figure 14A:
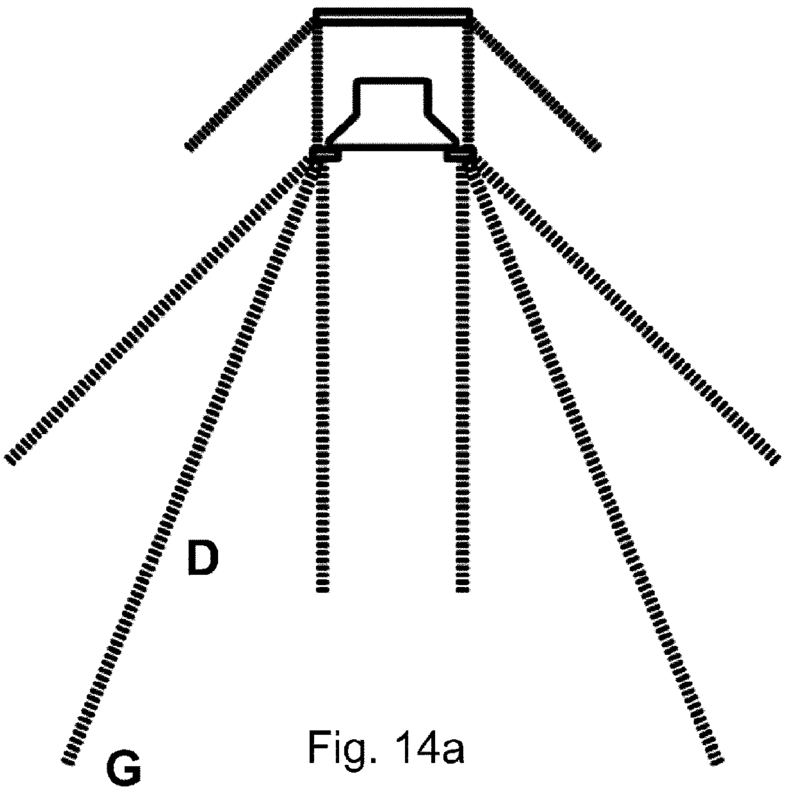
FIG. 14*a* shows a cross-sectional view of the loudspeaker assembly of FIG. 13*a* with an additional waveguide configuration (configuration G)

FIG. 14*a* is a cross-sectional view of the loudspeaker assembly from FIG. 13*a* with an additional waveguide configuration (configuration G). Configuration G represents a loudspeaker assembly with a waveguide having a wall length of 15 cm and an opening angle of 22.5°. This is the same as configuration D, but with a longer wall length (15 cm for configuration G vs 10 cm for configuration D).

Figure 14B:
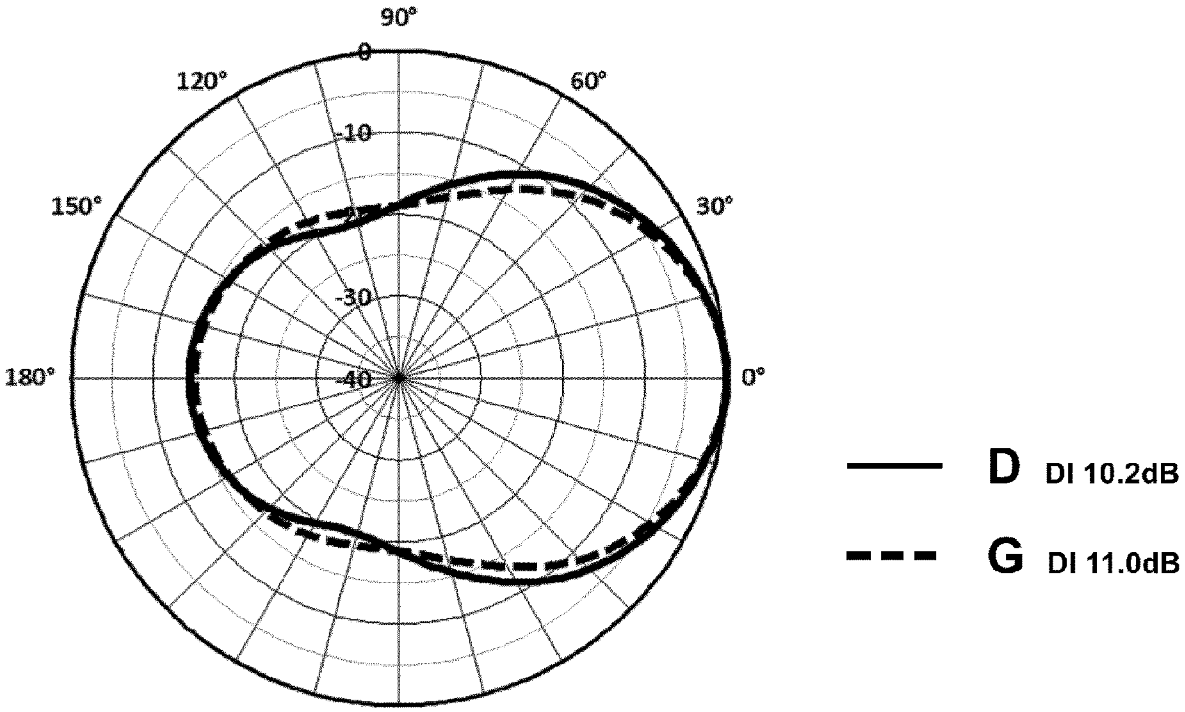
FIG. 14*b* shows computer simulated polar plots of broadband SPL responses and directivity indices for the waveguide configurations D and G of FIG. 14*a;*

FIG. 14*b* shows a computer simulated polar plot of broadband SPL responses and directivity indices for configurations D and G. The polar responses and directivity indices indicate that the longer waveguide used in configuration G results in further improvement to speaker performance (in terms of sound directivity).

FIGS. 15*a-d* show cross-sectional views of four different loudspeaker assemblies (configurations H, I, J and C). Each configuration has a loudspeaker with a diaphragm having an effective diameter of 5 cm, a rear enclosure, and a conical horn waveguide with a wall length of 15 cm.

Configuration H represents a classical horn loudspeaker assembly wherein all walls of the rear enclosure and the horn section are made from a hard, reflective material such that there is no interaction path between sound being radiated from the first and second radiating surfaces.

Configuration I represents a classical horn loudspeaker assembly which is the same as configuration H except that a back plate of the rear enclosure in configuration I is made of a porous material having a specific airflow of 3000 Pa·s/m. This configuration is analogous to FIG. 3 of U.S. Pat. No. 1,984,542, which describes the use of a felt back cover. Thus, in configuration I it is expected that there may be some, limited interaction between sound radiated from the first and second radiating surfaces, albeit only between the mouth of the waveguide and the backplate of the rear enclosure.

Configuration J represents a classical horn loudspeaker assembly which is the same as configuration H except that the waveguide is made of a porous material having a specific airflow of 1500 Pa·s/m.

Configuration C is the same configuration C that was shown in FIG. 12*a* in which the rear enclosure is entirely composed of a material with a specific airflow resistance of 3000 Pa·s/m and the waveguide is made of a porous material having a specific airflow resistance of 1500 Pa·s/m.

FIGS. 15*e-l* show computer simulated polar plots of SPL responses and directivity indices at various frequencies for configurations H, I J, and C. Here, the SPL responses are averaged over 1 octave bands (125 Hz, 250 Hz, 500 Hz, 1 kHz, 2 kHz and 4 kHz). This way the results for each frequency band can be used to determine which sections of the frequency spectra contribute most to the overall broadband results.

Figure 15A:
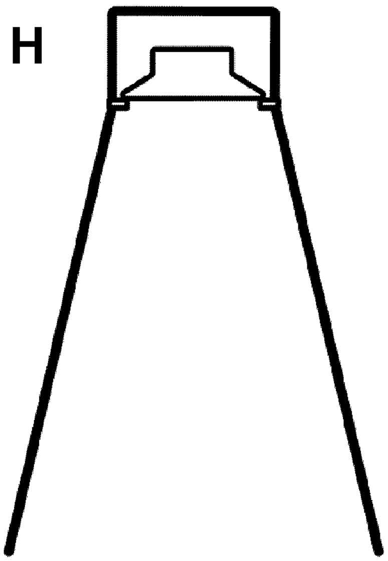
FIGS. 15*a-d* show cross-sectional views of four different loudspeaker assemblies (configurations H, I, J and C)
Figure 15B:
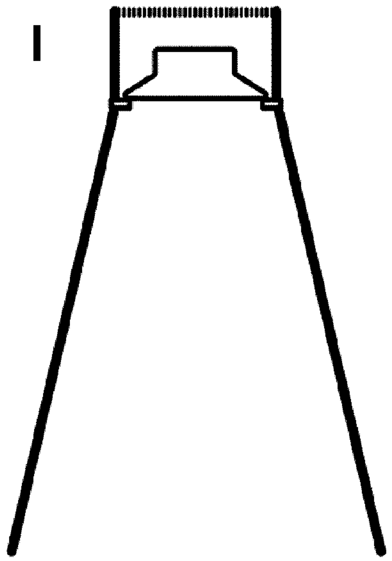
Figure 15C:
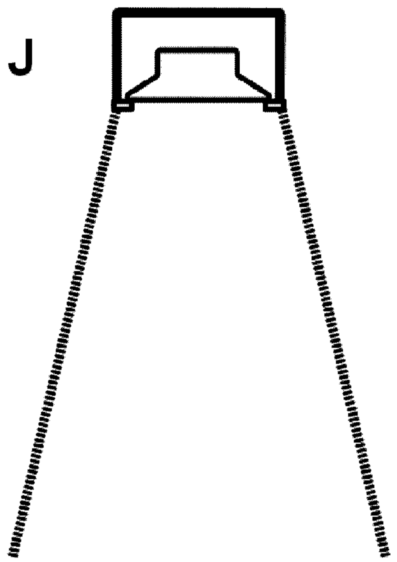
Figure 15D:
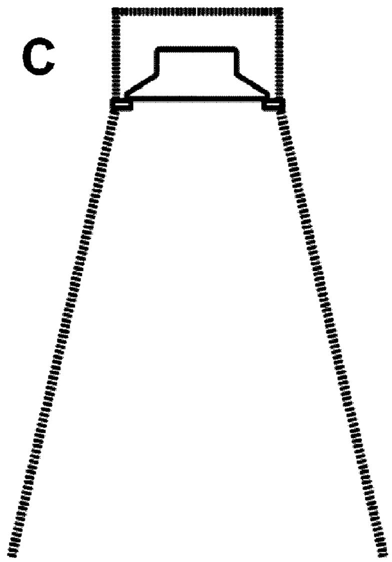
Figure 15E:
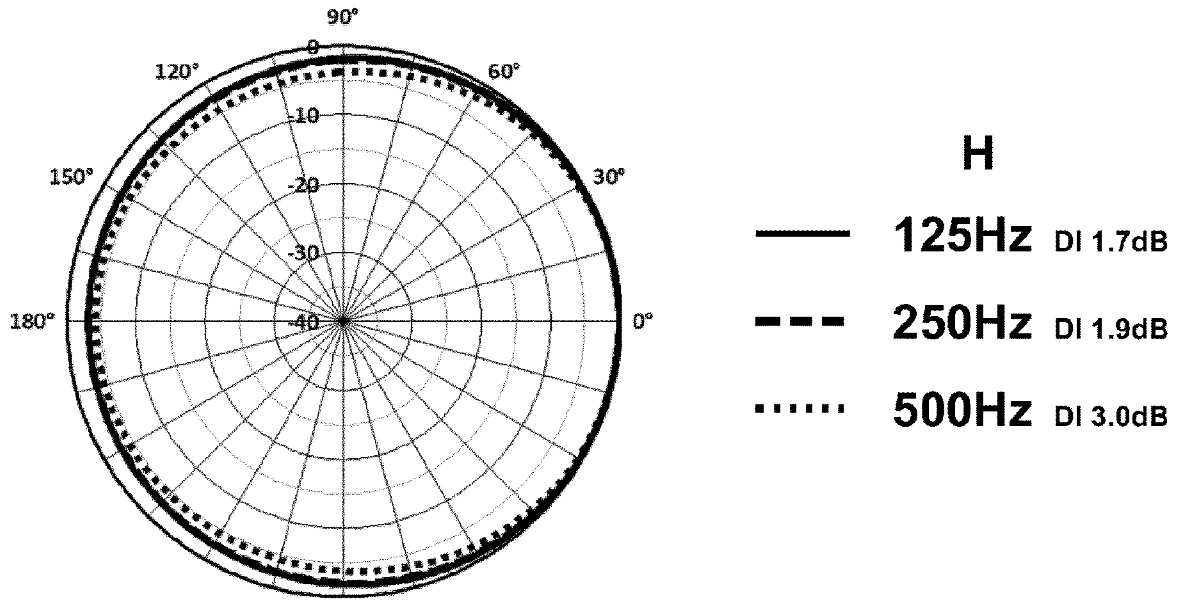
FIGS. 15*e-l* show computer simulated polar plots of SPL responses and directivity indices for the loudspeaker assemblies of FIGS. 15*a-d* at selected frequencies.
Figure 15F:
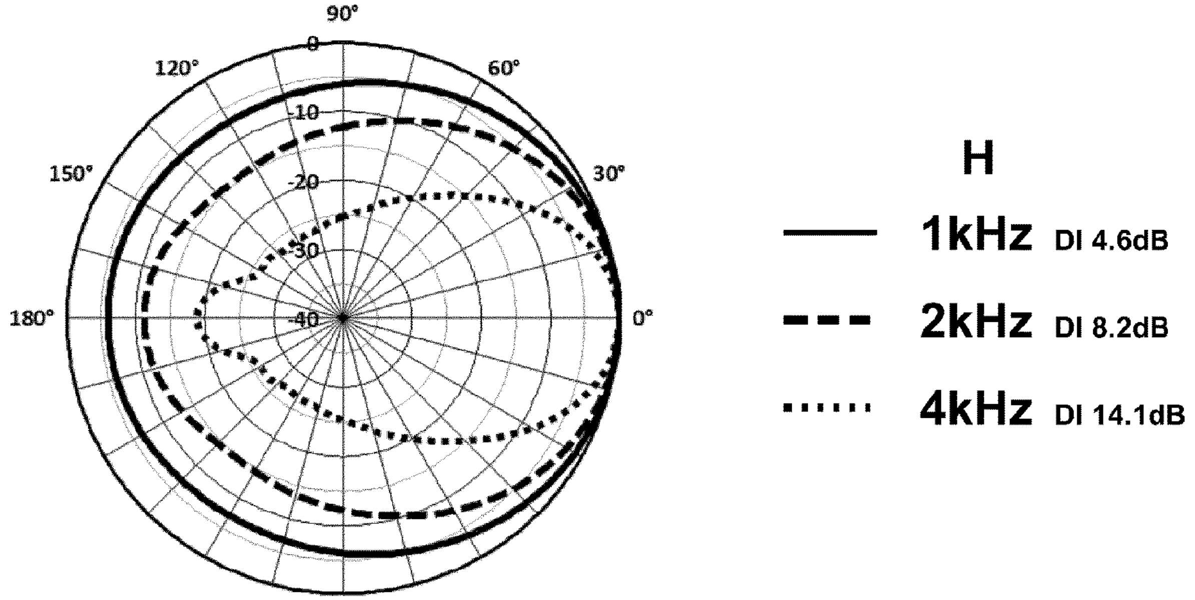
Figure 15G:
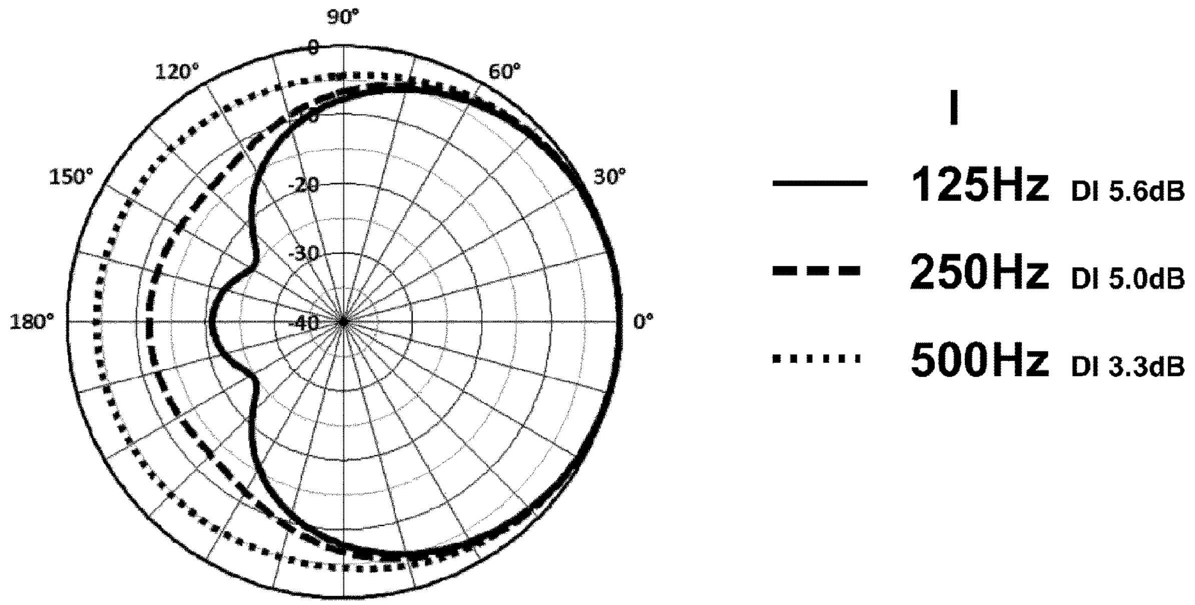
Figure 15H:
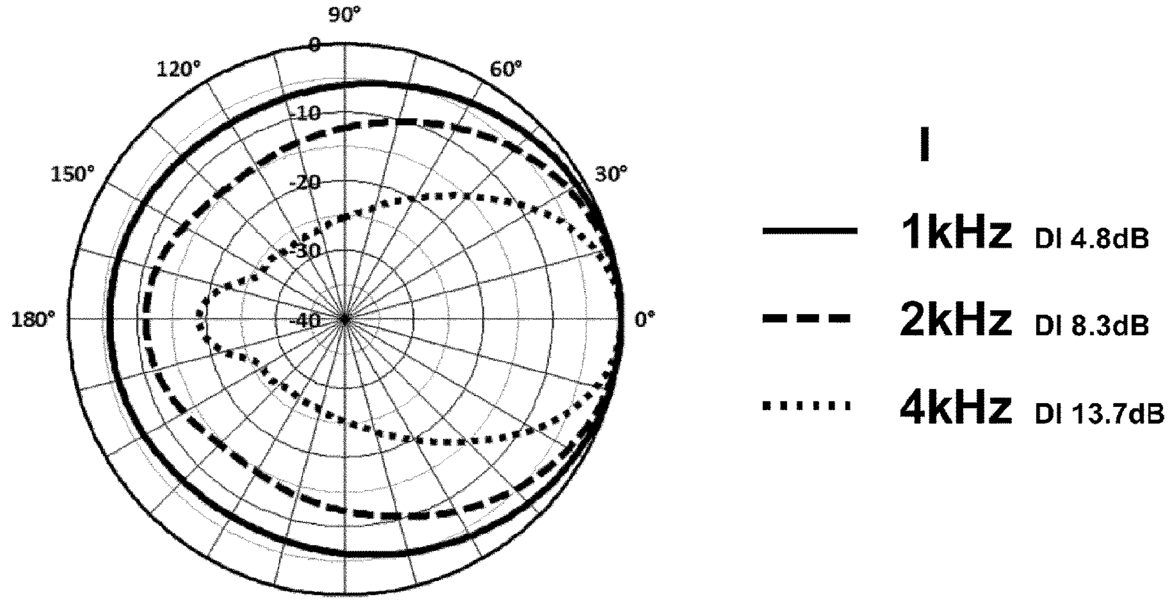
Figure 15I:
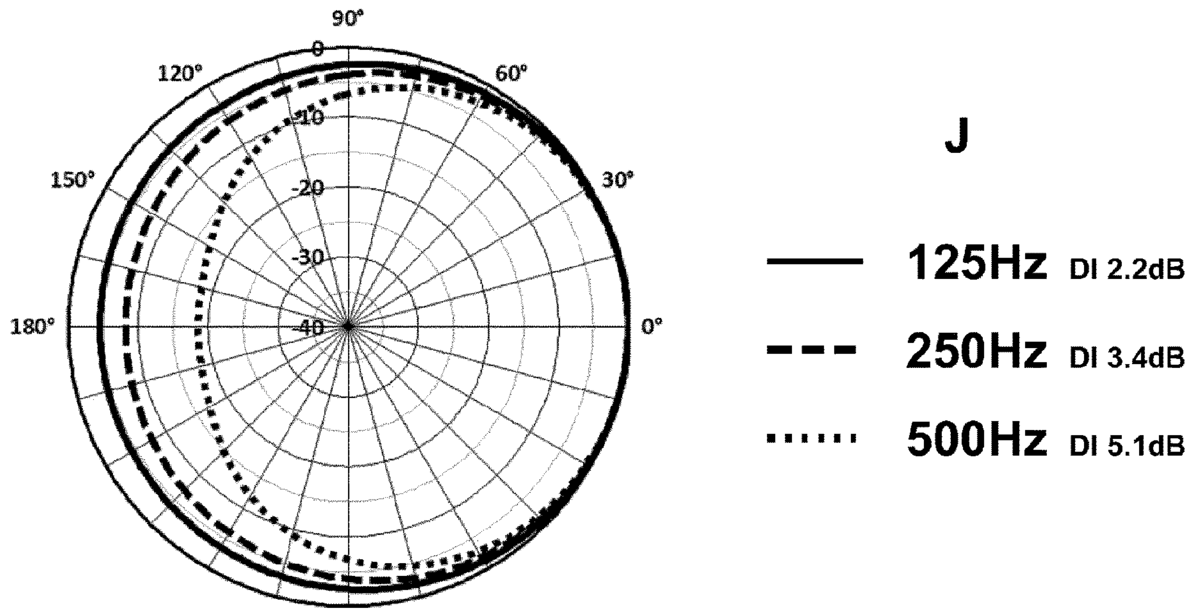
Figure 15J:
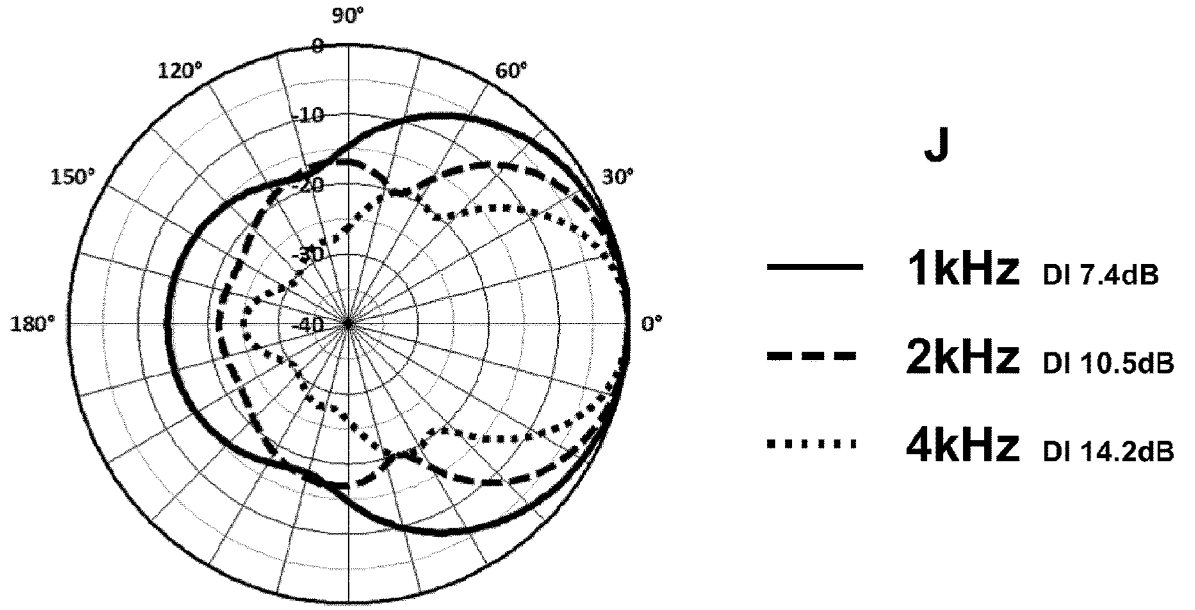
Figure 15K:
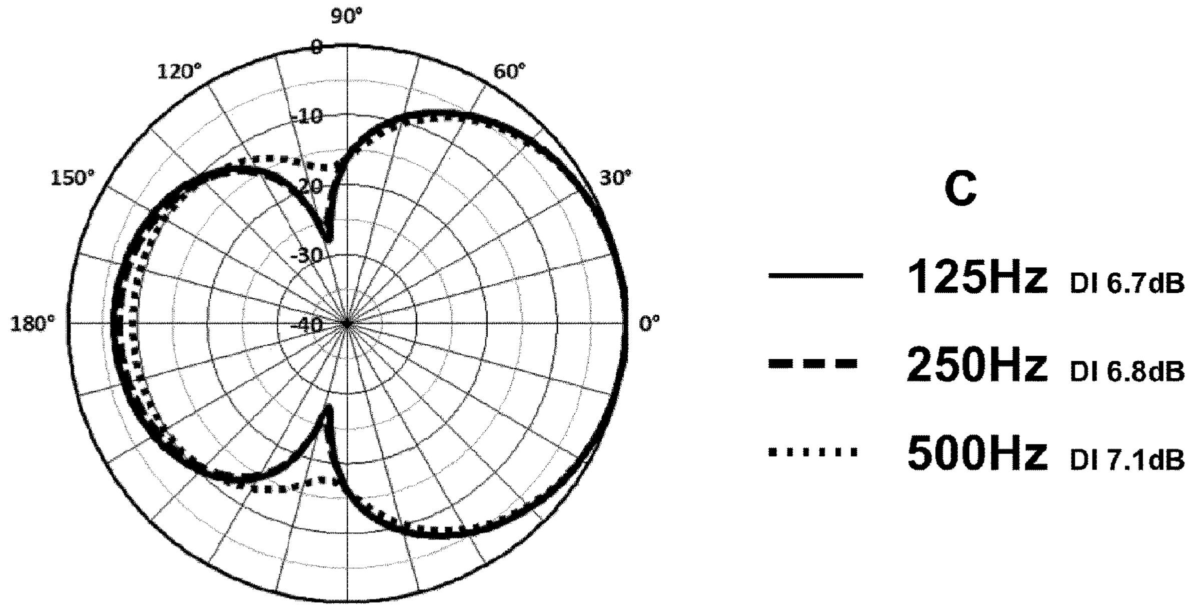
Figure 15L:
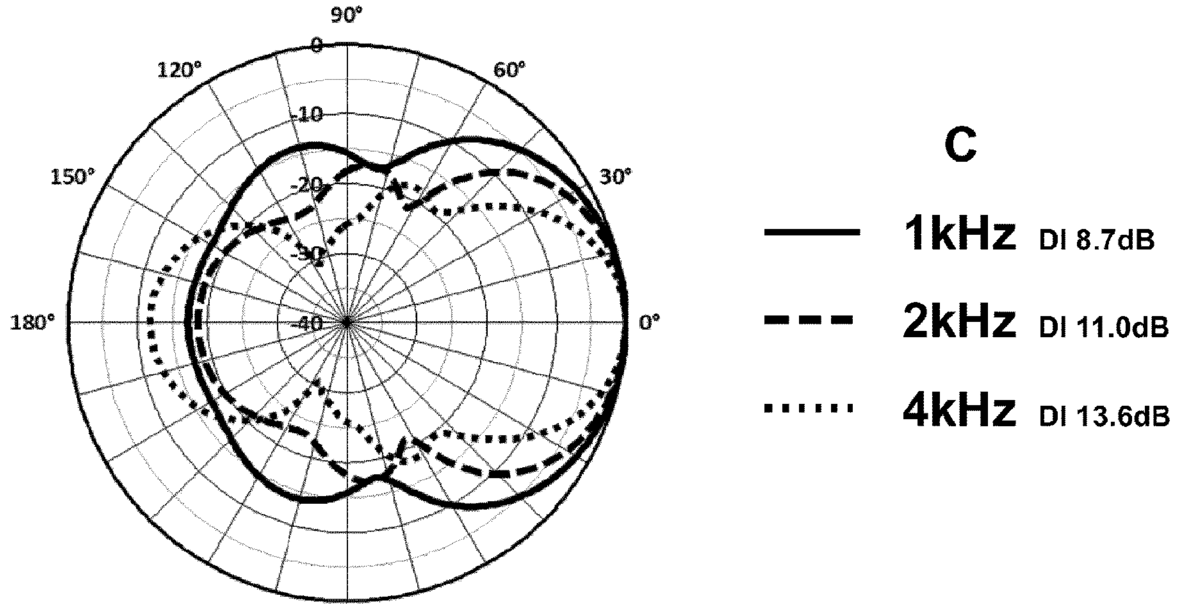
Figure 15M:
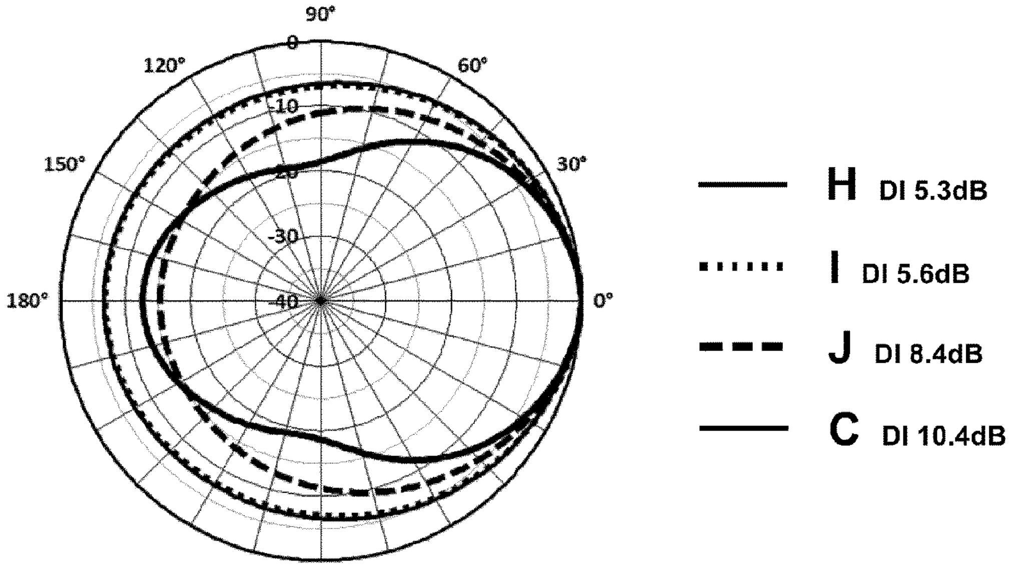
FIG. 15*m* shows a computer simulated polar plot of broadband SPL responses and directivity indices for the loudspeaker assemblies of FIGS. 15*a-d;*

FIG. 15*m* shows a computer simulated polar plot of the overall broadband SPL responses and directivity indices for configurations H, I J, and C. Accordingly, this plot represents an overview of the SPL responses of FIGS. 15*e-l* where the SPL responses are averaged over the range 100 Hz to 10 KHz.

As seen in FIGS. 15*e* and 15*f*, configuration H (representing a classical horn loudspeaker assembly) is very directive at high frequencies above 2 kHz. At low frequencies (wavelengths greater than the dimensions of the horn) the loudspeaker behaves like a monopole and low frequency sound is radiated equally in all directions. Thus, this configuration performs poorly at low frequencies (below 2 kHz) with low values of directivity indices and almost no visible suppression of SPL in the sideways directions (i.e. at 90 degrees).

Accordingly, configuration H predictably performs poorly overall when assessing a wide frequency range. The broadband polar plot in FIG. 15*m* shows almost no suppression of sound in the sideways directions, despite the high directivity of configuration H at high frequencies. The broadband directivity index of configuration H is 5.3 dB.

FIGS. 15*g* and 15*h* show that configuration I is also very directive at higher frequencies (above 2 kHz) and that configuration I performs slightly better than configuration H at lower frequencies, in particular in the 125 Hz band. However, the performance of configuration I is still significantly omnidirectional at the lower frequencies owing, it is believed, to the lack of a clear interaction path between the front and rear radiating surfaces.

Although there is an improvement in configuration I over configuration H over a small low frequency bandwidth, only octave band 125 Hz performs particularly well. The contribution of this narrow range to the wide bandwidth directivity is very limited, as can be seen in the broadband polar plot of FIG. 15*m*. Consequently, configuration I performs poorly in the broadband response shown in FIG. 15*m* and has a broadband directivity index of just 5.6 dB.

FIGS. 15*i* and 15*j* show that configuration J is even more directive than configurations H and I at higher frequencies (above 1 kHz) but remains largely omnidirectional at lower frequencies (below 1 kHz). Configuration J represents a loudspeaker assembly in which the waveguide is made of a porous material but the rear enclosure is not. Therefore, it is believed that there is no interaction of sound radiating from the front and rear radiating surfaces, thereby limiting the cancellation effects described above and resulting in a low directivity of sound at lower frequencies. On the other hand, the improved performance at higher frequencies is believed to be because the incorporation of a porous material in the waveguide may suppress unwanted resonances that can occur in the waveguides of traditional horn loudspeakers which have non-porous waveguides.

As shown in FIG. 15*m*, configuration J appears to have a more directive broadband polar response than configurations H and I. Configuration J also has a higher directivity index for the broadband response at 8.4 dB. However, it is clear from the polar responses for the consecutive octave bands for configuration J in FIGS. 15*i* and 15*j*, that the performance of this loudspeaker assembly at low frequencies is still largely omnidirectional.

In contrast, FIGS. 15*k* and 15*l* show polar plots and directivity indices for configuration C (which represents a loudspeaker assembly according to the first aspect of the present invention) which demonstrates improved directivity over all of the frequency bands. In particular, the directivity indices for 1 kHz and 2 kHz are higher than for the previous three configurations. This is particularly desirable because the human ear is very sensitive to sounds at or around 1 kHz and 2 kHz. FIG. 15*k* shows a large improvement in directivity at low frequencies, and an overall very homogeneous response across all of the low frequency octave bands. FIG. 15*l* shows further improvements of configuration C over the previous three configurations in the higher frequency bands, especially in the 1 kHz and 2 kHz octave bands.

Consequently, the broadband polar response shown in FIG. 15*m* shows that the loudspeaker assembly according to configuration C is very directive across a wide range of frequencies compared to configurations H, I and J. This is particularly clear from the broadband directivity index for configuration C (10.4 dB) which is significantly higher than the next closest contender (configuration J at 8.4 dB).

It is clear from FIGS. 15*a*-15*m* that regions of porous material are required in the waveguide and in the rear enclosure to achieve high directionality across a broad range of frequencies.

Figure 15N:
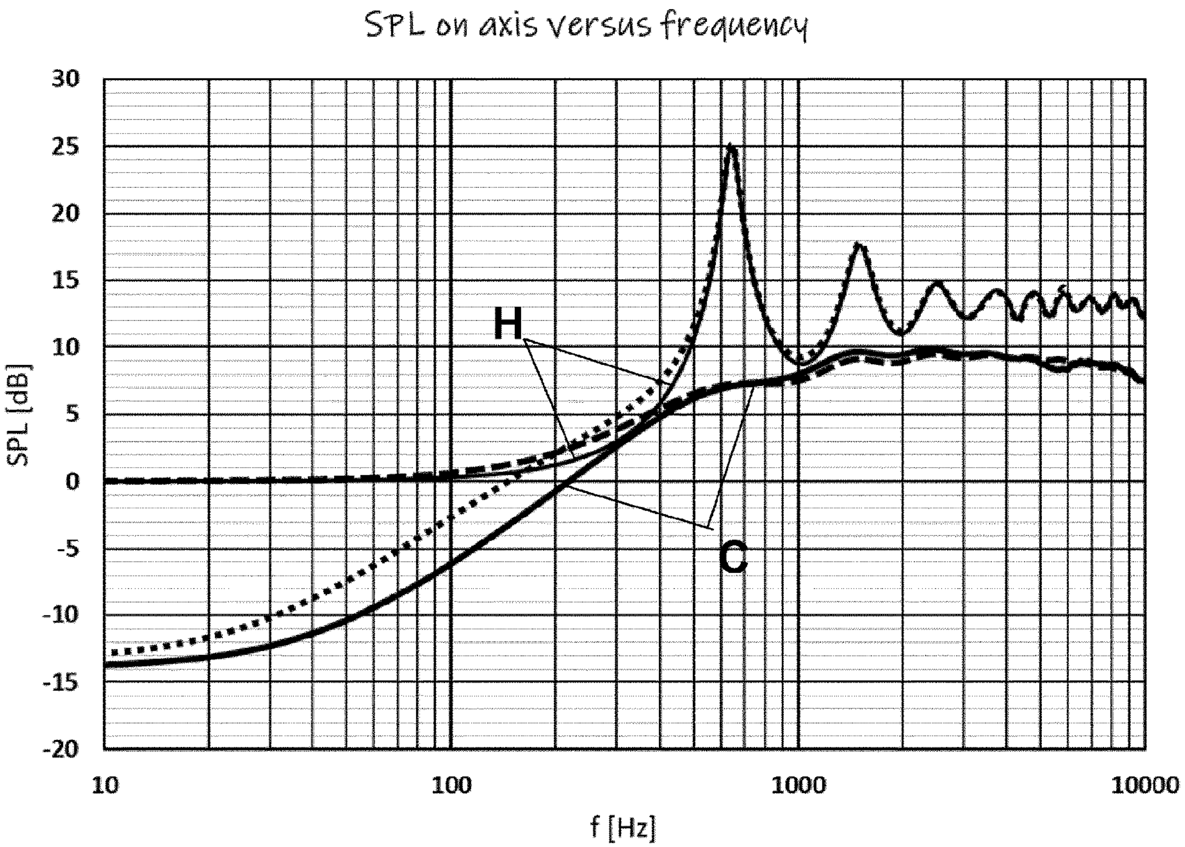
FIG. 15*n* shows a 0° axis frequency responses for each of the loudspeaker assemblies of FIGS. 12*a-d;*

FIG. 15*n* shows 0° axis frequency responses for each of the loudspeaker assemblies of FIGS. 15*a-d* (configurations H, I, J and C).

Configuration C, represented by the thicker solid line, has a smoother frequency response than configurations H and I (which represent classical loudspeakers with solid, non-porous horns). However, configuration C is less efficient at producing sound at the higher frequencies than configurations H and I (evidenced by the fact that the SPL at 0° is lower for configuration C than configurations I and H at frequencies above 500 Hz). For the upper frequency range this loss can be explained by the friction introduced by implementing a waveguide made entirely from a porous material.

Configuration C is also less efficient that the other three configurations at lower frequencies (below 500 Hz). It is believed that this loss in the lower frequencies may be due to the cancellation effect that configuration C induces between sound being radiated by the first radiating surface and sound being radiated by the second radiating surface since this cancellation effect is most prevalent at lower frequencies.

However, since the present invention is intended to be used to produce personalised sound the user will likely be in proximity to the loudspeaker. Therefore, a loss of efficiency is less of a concern than if the sound was required to be very loud or propagate across a large distance. This is in contrast to the prior art (for example see U.S. Pat. No. 1,984,542) where horn loudspeakers are typically used for increasing the efficiency of a loudspeaker to suit far field applications, (e.g. sound reinforcement at large public events). The loudspeaker of the present invention is, instead, intended to produce highly localised, personal sound.

Figure 16A:
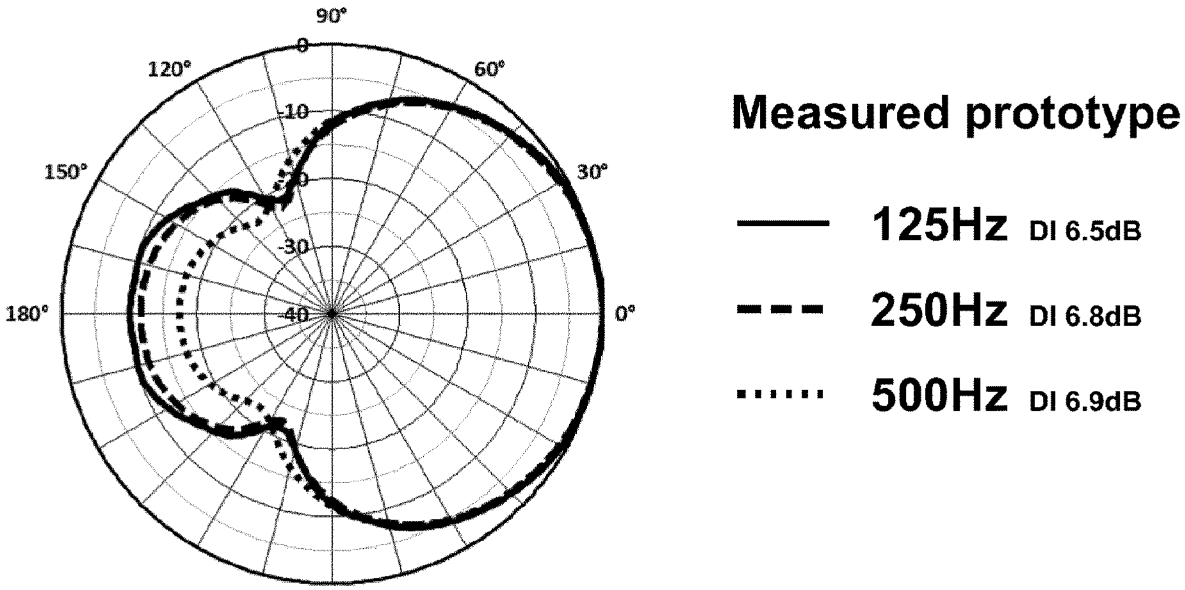
FIGS. 16*a-b* show experimentally measured polar plots of broadband SPL responses and directivity indices for a prototype loudspeaker assembly according to the first aspect of the present invention.
Figure 16B:
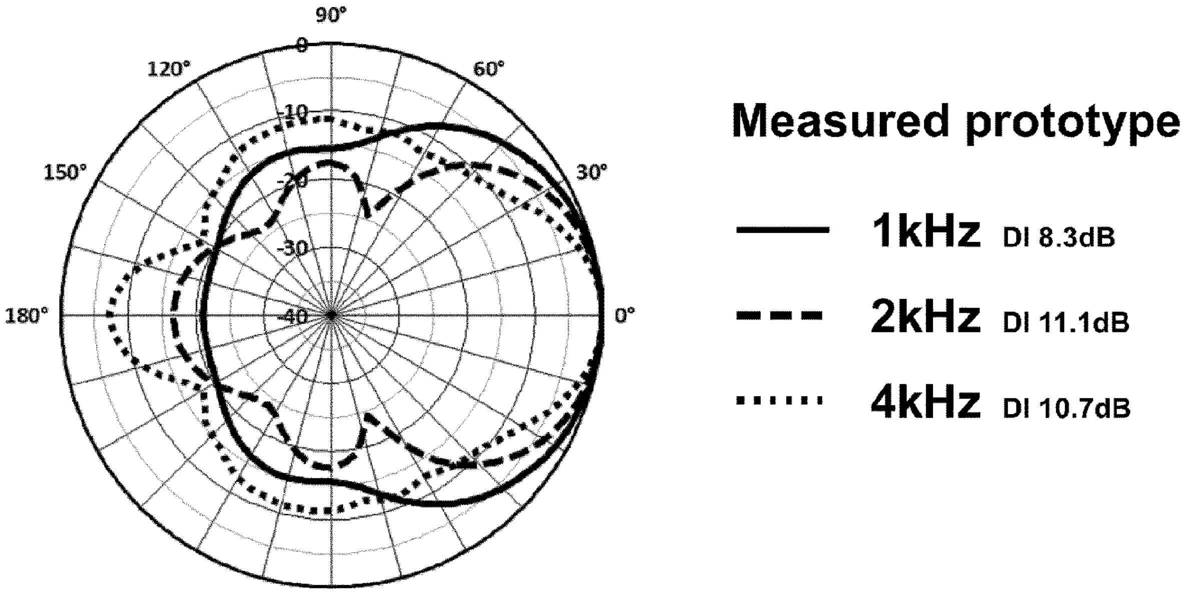

FIGS. 16*a*-16*b* show experimentally measured polar plots of SPL responses and directivity indices at various frequencies for a prototype loudspeaker assembly according to the present invention. FIG. 13*c* shows a 0° axis frequency response for the prototype loudspeaker assembly of FIGS. 16*a*-16*b*.

The prototype loudspeaker was constructed according to the loudspeaker assembly in FIG. 1*a* which is the same as configuration B. Accordingly, the prototype loudspeaker assembly comprised a rear enclosure with a rigid, non-porous back plate and front plate joined by an outer wall made of a porous material.

Note that configuration C, having a rear enclosure made entirely from porous material, may be seen as a preferred implementation as evidenced by the results in FIG. 12*b*. However, FIG. 12*b* also shows that there is little increase in directivity between configurations B and C. While both configurations would be possible, constructing a prototype according to configuration B is simpler.

The loudspeaker included in the prototype loudspeaker assembly is the same design as the loudspeaker 101 previously described for the loudspeaker assembly 100 of FIG. 1*a*, with parameters as set out in the following paragraphs.

Thus, with reference to FIG. 1*a*, the prototype loudspeaker has an effective radiating diameter D of 5 cm and the following parameters:

Re 3.8 ohm (dc resistance of the voice coil 128).

Le 0.1 mH (inductance of the voice coil 128 when it is positioned in the airgap)

Fs 145 Hz (resonant frequency of the mobile system comprising Mms and Cms below)

Sd 19.6 $cm^2$ (effective radiating surface area of the loudspeaker)

Mms 2.0 g (total moving mass of mobile system)

Cms 0.6 mm/N (compliance of the spider 116 and the surround 118 combined)

BL 2.1 Tm (magnetic field strength in the airgap x voice coil wire length).

Qms 4.2 (mechanical quality factor of the mobile system at the resonant frequency)

Here, the total mass, Mms, of the mobile system is the mass of all of the elements of the loudspeaker 101 that move with the voice coil 128. Some elements only contribute partially to the moving mass of the mobile system. Thus, for the purpose of simulating the prototype, the moving mass, Mms was taken to include the 100% of the mass of the following elements: the dust cap 111, the diaphragm 110, the coil former 127, the voice coil 128, and the portion of the lead wire 126 which is fixed to the diaphragm 110; and also 50% of the mass of the following elements: the surround 118, the spider 116, and the portion of the lead wire 126 that is free to move (i.e. the portion not fixed to the diaphragm).

Again for the purpose of simulating the prototype, the effective radiating diameter D (=5 cm) was taken to be the diameter of the surround 118 (which may also be referred to as a "roll suspension") as measured from the middle of the of the surround 118, as shown on FIG. 1*a*. The effective radiating surface area was similarly taken to be the area corresponding to a circle of diameter D (=pi*$(D/2)^2$). This equates to the effective radiating surface area of the loudspeaker 101. For more complex geometries, the effective radiating area of a loudspeaker may be calculated by, for example, the technique described in https://www.klippel.de/fileadmin/klippel/Files/Know_How/Application_Notes/AN_32_Effective_Radiation_Area.pdf.

The front and back plates have a diameter of 10 cm. Both front and back frame parts are made from stiff material such as plastic. The outer wall is made from a 5 mm thick felt which measures an Rs (specific airflow resistance) of 2750 Pa·s/m.

Figure 17:
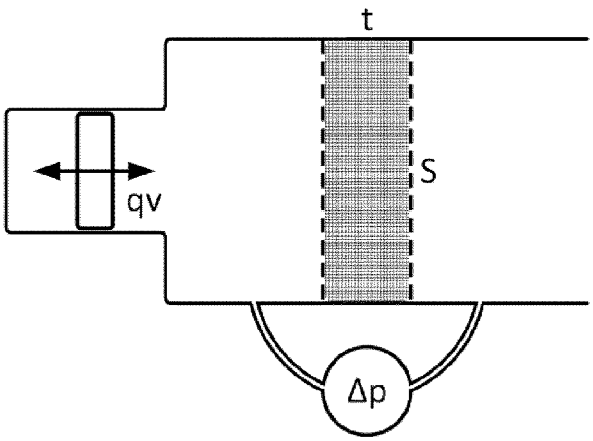
FIG. 17 illustrates how values of specific airflow resistance can be calculated.

The waveguide is a self-supporting conical horn made entirely of a 3 mm thick felt sheet. The felt used to make the waveguide was folded into the correct geometry resulting in a seam along the waveguide. The seam consists of glue which covered with a textile tape. The specific airflow resistance of the 3 mm thick felt sheet was measured to be 1300 Pa·s/m. The specific airflow resistance was measured in accordance with ISO 9053-2. Specifically, with reference to FIG. 17, the displacement of a diaphragm moving at a very low frequency (below 10 Hz) was measured using a laser to obtain a known volume displacement of air, $q_v$. At the same time the pressure difference Δp across a material sample, located in the same chamber as the diaphragm, was measured using a pressure microphone. The airflow resistance, R, (in Pa·s/$m^3$) of the material sample is then given by:

$$R = \Delta p/q\_v$$

and the specific airflow resistance, $R_s$, (in Pa·s/m) is calculate by multiplying the air flow resistance with the surface area, S, of the material sample as in the following:

$$R_s = R \cdot S$$

The prototype loudspeaker assembly was measured in an anechoic chamber 1*m* from the diaphragm with 2 Vrms stimulus to produce the polar responses of FIGS. 16*a* and 16*b*. These responses confirm the responses calculated using FEM (as discussed for FIGS. 15*a* to 15*n*) and shows good performance is seen across the full frequency range—with the exception of the 4 kHz octave band.

The 4 kHz octave band has a lower directivity index than for the 2 kHz band (in contrast to the FEM simulations). It is believed that this is because all of the simulations are based on a rigid diaphragm having a constant acceleration. Thus, the simulated diaphragms behave like a rigid piston over the entire frequency range. In contrast, real world loudspeaker diaphragms break-up in the mid frequency band which can result in an uneven off-axis response, scattering the sound more to the sides than to the front. The resulting dip around 4 kHz in the 0° frequency response in FIG. 16*c* could be an indication of this diaphragm break up.

Subjective tests, whereby listeners stood beside the prototype loudspeaker assembly to experience sound produced by the prototype loudspeaker assembly, revealed no noticeable dip in directivity at 4 kHz. Moreover, the 0° frequency response is used as reference to calculate the normalised polar response. Therefore, an alternative explanation to the lower directivity at 4 kHz, may be that the dip in the 0° frequency response at 4 kHz has caused the measured directivity of the loudspeaker at 4 kHz to appear artificially low since this is the reference to which all other angles in the polar response where compared. In other words, a dip in the 0° response may introduce excess off-axis levels of SPL.

Figure 16C:
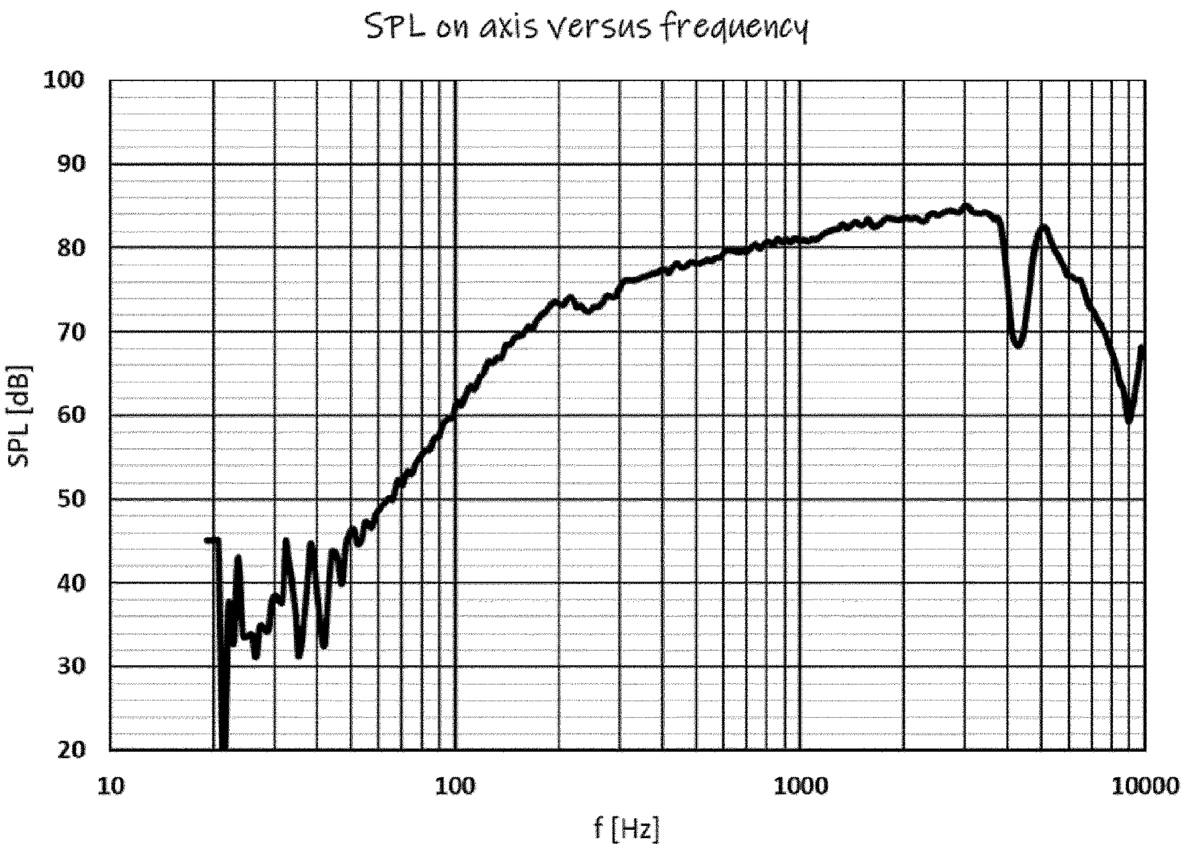
FIG. 16*c* shows a 0° axis frequency response for the prototype loudspeaker assembly of FIGS. 16*a-b;*
Figure 16D:
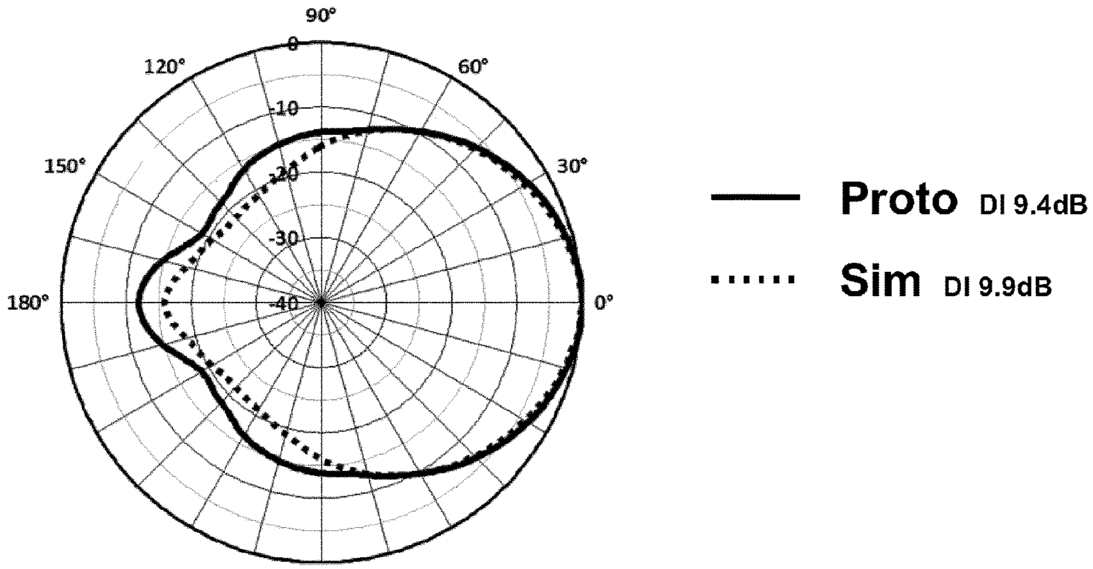
FIG. 16*d* shows theoretical (labelled "Proto") and computer simulated (labelled "Sim") polar plots of broadband SPL responses for the prototype loudspeaker assembly of FIGS. 16*a-b;*

FIG. 16*c* shows a polar plot of broadband SPL responses and directivity indices for the prototype loudspeaker assembly of FIGS. 16*a*-16*b* compared with a FEM simulation of the prototype loudspeaker assembly.

The prototype loudspeaker produces a very similar polar response to the simulation confirming the theory behind the design of the prototype and showing that high performance may be achieved in practice. The deviation in polar response seen at 115° can be explained the contribution of the lower directivity of the prototype in the 4 kHz octave band.

Figure 18A:
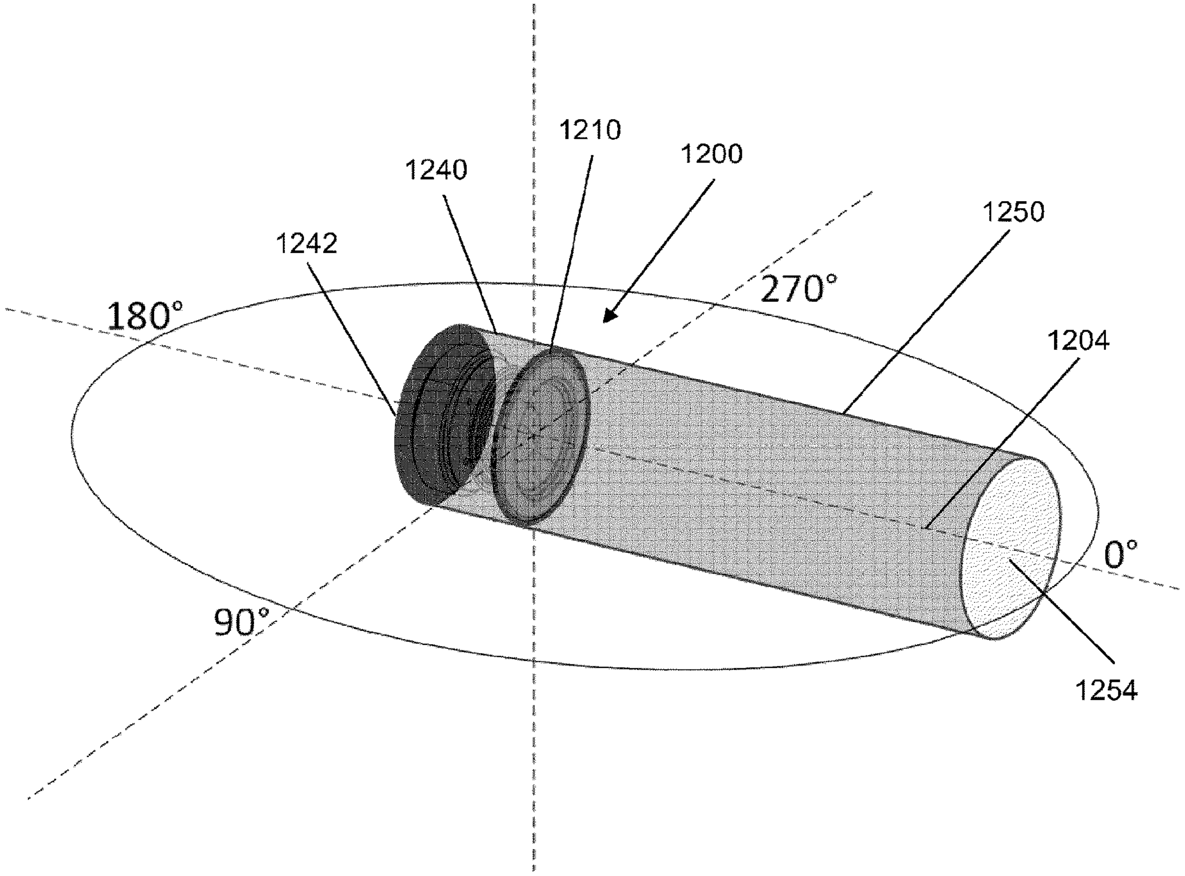
FIG. 18*a* shows a perspective view of another example loudspeaker assembly.

FIG. 18*a* shows a perspective view of another example loudspeaker assembly 1200 used for experimental measurements as discussed below in reference to FIGS. 20-23. Here we note that FIGS. 18-23 are all based on real samples that were measured under fully anechoic conditions (4 pi) and half space anechoic conditions (2 pi) for the wall mounted examples.

In FIG. 18*a* the first radiating surface of a diaphragm 1210 is configured to radiate sound into a 15 cm long and 5 cm wide tube made from a felt material having a specific airflow resistance of 1200 Pa·s/m. The tube forms the waveguide 1250 of the loudspeaker assembly 1200 and is configured to radiate the sound towards a mouth 1254. In FIG. 18*a* the mouth 1254 of the waveguide 1250 is open and exposed to the exterior of the loudspeaker assembly 1254.

The rear (second radiating surface) of the loudspeaker diaphragm 1210 is configured to radiate sound into a second tube (i.e. the rear enclosure 1240 of the loudspeaker assembly 1200) which is made from a felt material with a specific airflow resistance of 2400 Pa·s/m. The tube forming the rear enclosure 1240 is 3 cm long and 5 cm wide and is closed at the back by a non-porous back plate 1242.

In FIG. 18*a* the loudspeaker assembly 1200 is represented in a free field (i.e. without any hard boundaries located nearby).

A 0° axis 1204 extending through and perpendicular to the diaphragm 1210 of the loudspeaker is shown as a reference for the measurements discussed below.

Figure 18B:
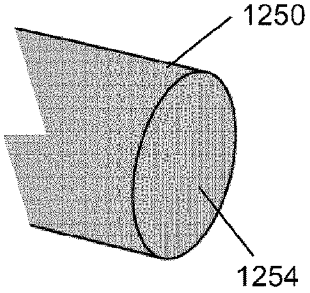
FIGS. 18*b*-18*c* show partial perspective views of the loudspeaker assembly of FIG. 18*a* two different waveguide configurations.
Figure 18C:
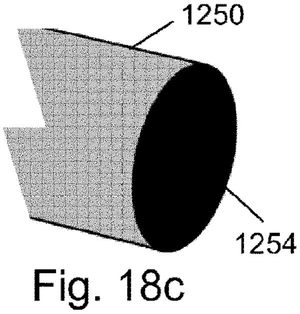

FIGS. 18*b*-*c* show two partial perspective views of alternate configurations for the mouth 1254 of the waveguide 1250 in FIG. 18*a*. In FIG. 18*b*, the mouth 1254 of the waveguide 1250 is covered by the same felt material as the waveguide 1250 itself (i.e. a felt material having a specific airflow resistance of 1200 Pa·s/m). In FIG. 18*b*, the mouth 1254 of the waveguide 1250 is covered by a hard, reflective material such as a 3 mm thick plastic cover.

Figure 19A:
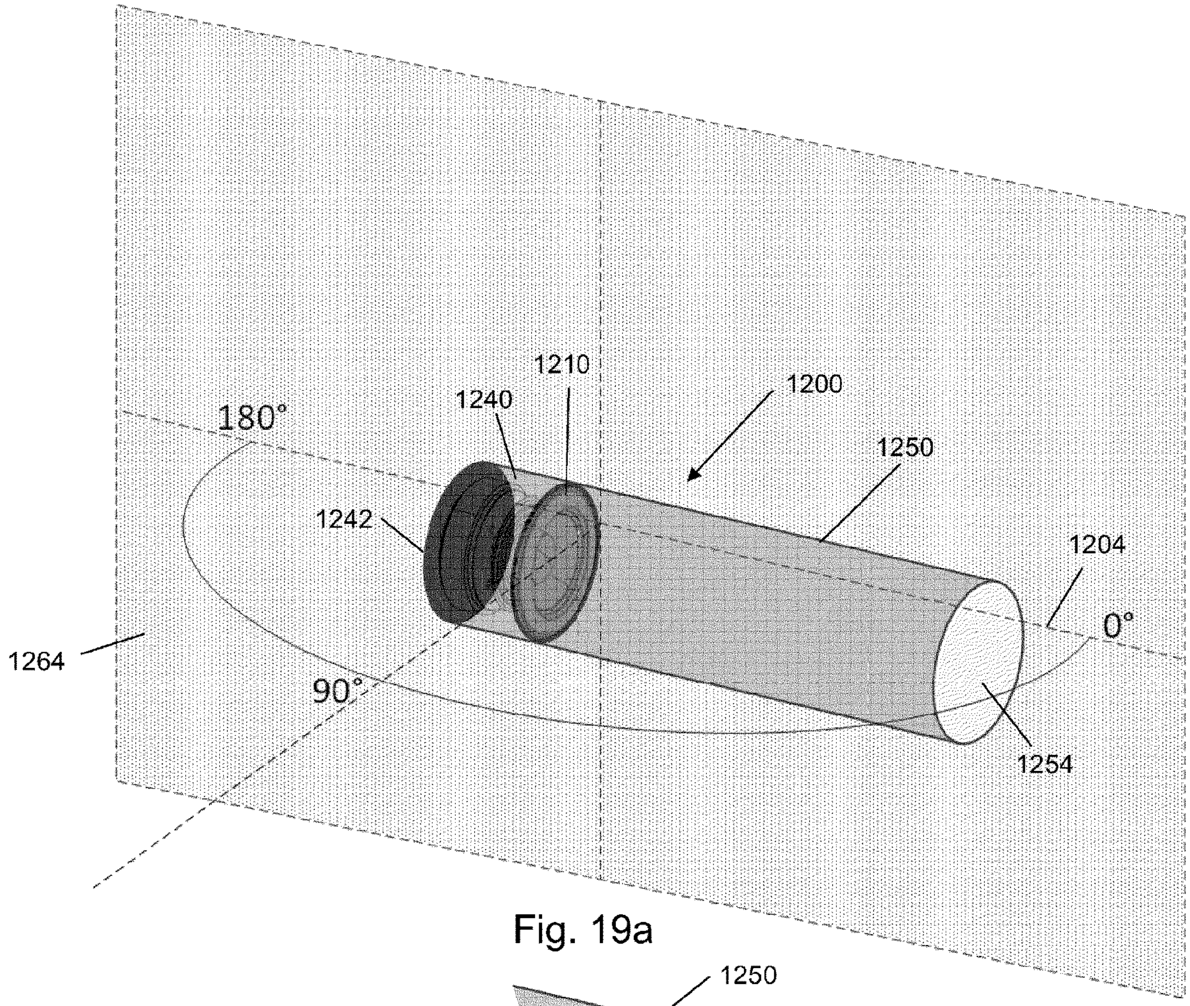
FIG. 19*a* shows a perspective view of another example loudspeaker assembly.

FIG. 19*a* also shows a perspective view of the loudspeaker assembly 1200 of FIG. 18*a* used for computer simulations which are discussed below in reference to FIGS. 20-23. However, in FIG. 19*a* the loudspeaker assembly 1200 is mounted parallel to and against an infinite baffle 1264. Note that in FIG. 19*a* the 0° axis 1205 is positioned near the baffle 1264 instead of passing through the centre of the loudspeaker assembly 1200.

Figure 19B:
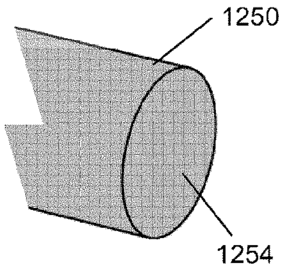
FIGS. 19*b*-19*c* show partial perspective views of the loudspeaker assembly of FIG. 19*a* two different waveguide configurations.
Figure 19C:
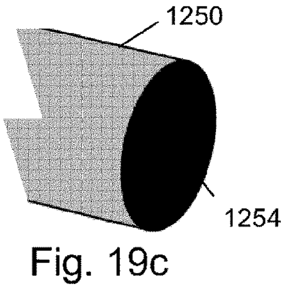
Figure 20:
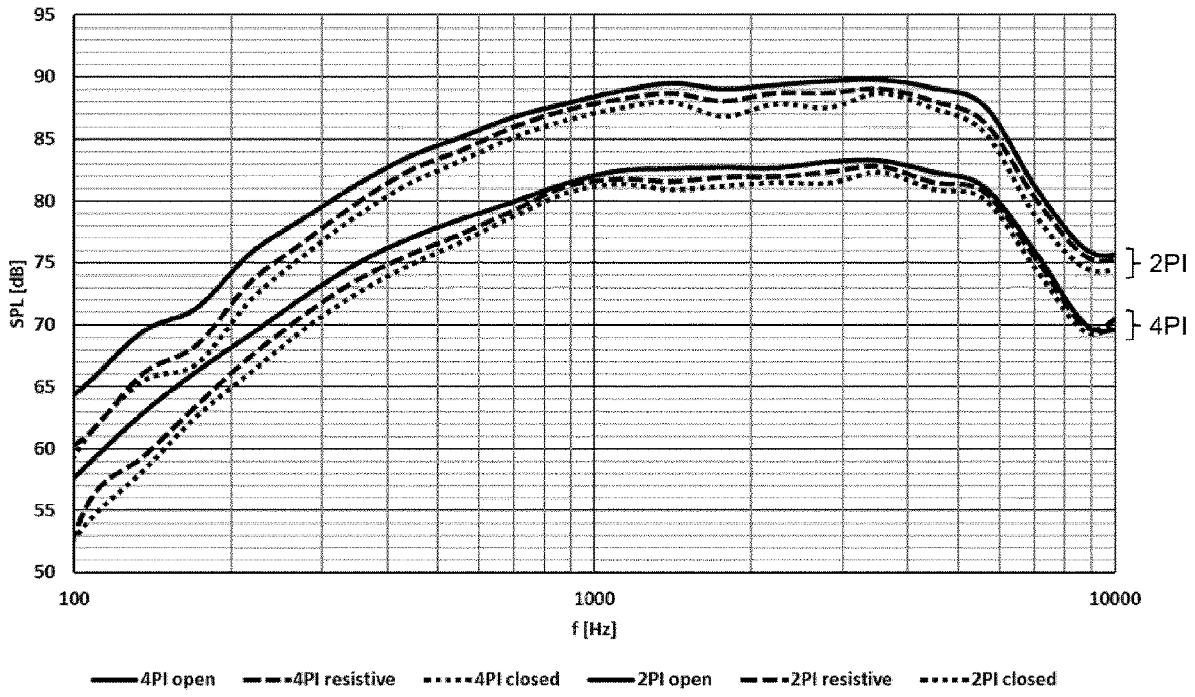
FIGS. 20-23 show experimental (measurement) data for the loudspeaker assemblies of FIGS. 18*a*-19*c*.

FIGS. 19*b*-*c* show the same two additional configurations for the mouth 1254 of the waveguide 1250 as in FIGS. 18*b*-*c* (i.e. in FIG. 19*b* the mouth 1254 of the waveguide 1250 is covered by the same felt material as the waveguide 1250 and in FIG. 19*c* the mouth 1254 of the waveguide 1250 is covered by a hard, reflective material such as a 3 mm thick plastic cover). The additional configurations for the mouth 1254 of the waveguide 1250 shown in FIGS. 19*b*-*c* are intended to be optionally applied to the loudspeaker assembly of FIG. 19*a*, i.e. when the loudspeaker assembly 1200 is mounted to an infinite baffle 1264. FIG. 20 shows 0° axis frequency responses (SPL vs frequency) for each of the loudspeaker assemblies of FIGS. 18*a*-19*c* (i.e. loudspeaker assemblies wherein the mouth of the waveguide is open, resistive, or closed, and wherein the loudspeaker assembly is located in free space or next to an infinite baffle). In FIG. 20 the SPL of each loudspeaker is measured 1 m from the loudspeaker of the loudspeaker assembly along the 0° axis and the loudspeaker is being provided with a Vrms=2V electrical signal.

The loudspeakers in each of the following measurements have the following parameters:

Sd=14 $cm^2$ (effective surface area of diaphragm);
Fs=200 Hz (resonance frequency of moving parts);
Mms=1.5 g (mass of moving parts);
Re=3.4Ω (electrical impedance);
BL=2.9 Tm (motor strength); and
Qms=4 (mechanical quality factor indicating friction losses of moving parts).

In FIG. 20 the lower three lines in the graph, named "4 PI open", "4 PI resistive", and "4 PI closed", represent the measured SPL performance of the loudspeaker assemblies of FIGS. 18*a*-*c* which are positioned in free space (4 pi solid angle in steridians). "4 PI open" refers to the loudspeaker assembly where the mouth of the waveguide is open, "4 PI resistive" refers to the loudspeaker assembly where the mouth is covered by a resistive material, and "4 PI closed" refers to the loudspeaker assembly where the mouth is covered by a hard reflective material. The upper three lines in the graph, named "2 PI open", "2 PI resistive", and "2 PI closed", represent the measured SPL performance of the loudspeaker assemblies of FIGS. 19*a*-*c* which are mounted against an infinite baffle (2 pi solid angle in steridians).

The above two (upper and lower) groups of frequency responses are separated in FIG. 20 by about 6 dB. It is thought that this is because the infinite baffle reflects the sound energy from the loudspeaker back towards the environment I which the loudspeaker assembly is located which results in an SPL that is twice that of the free-field SPL while maintaining the shape of the transfer function.

FIG. 20 also shows that the observed 0° axis SPL reduces as the resistivity of the mouth of the waveguide is increased from open to closed. However, the reduction in SPL is not large, showing that the loudspeaker assembly still provides useful levels of sound even if the mouth is covered by a reflective material.

FIG. 20 shows a graph of the directivity index (DI) against frequency for each of the loudspeaker assemblies of FIGS. 18*a*-19*c*.

Figure 21:
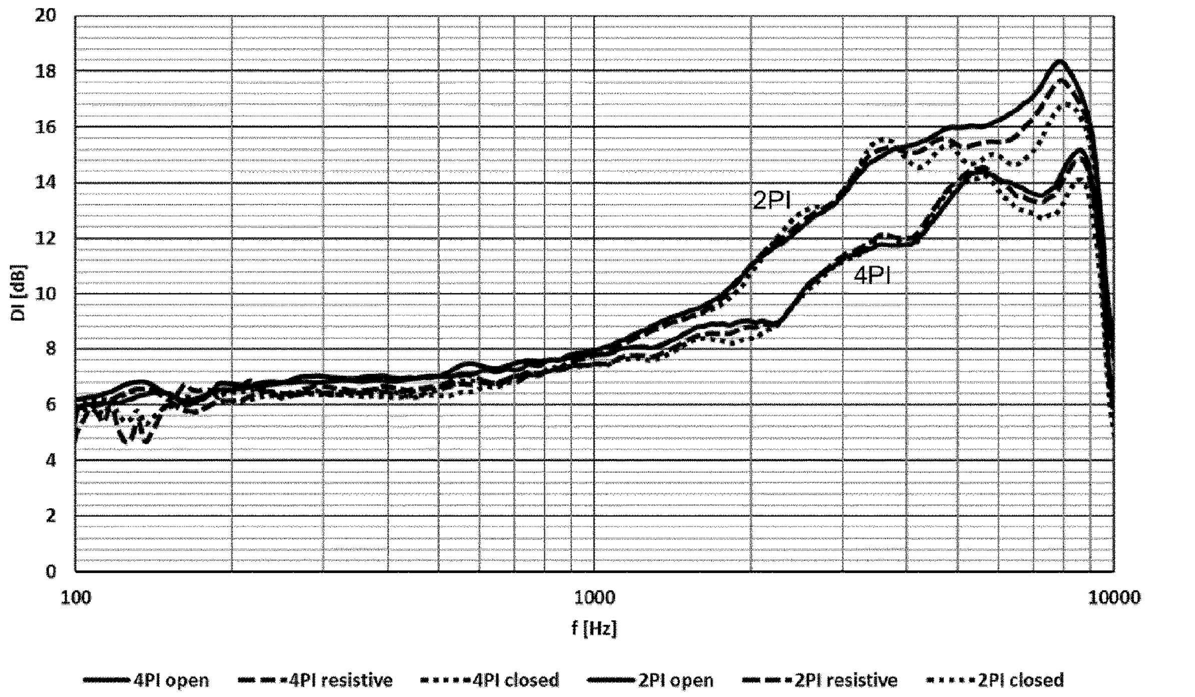

In FIG. 21 the lower three lines in the graph, named "4 PI open", "4 PI resistive", and "4 PI closed", represent the measured directivity of the loudspeaker assemblies of FIGS. 18*a-c* which are positioned in free space. The upper three lines in the graph, named "2 PI open", "2 PI resistive", and "2 PI closed", represent the measured directivity of the loudspeaker assemblies of FIGS. 19*a-c* which are mounted against an infinite baffle.

FIG. 21 shows that there are minor differences in the directivity performance of the loudspeaker assembly when the mouth of the waveguide is varied between the open, resistive, and closed configurations. Therefore, the loudspeaker assembly may be used in more applications where the mouth might be covered without affecting the directivity performance of the loudspeaker assembly.

FIG. 21 also shows that there can be an advantage in mounting the device to a baffle or wall as this increases the directivity of the loudspeaker assembly at higher frequencies.

Figure 22:
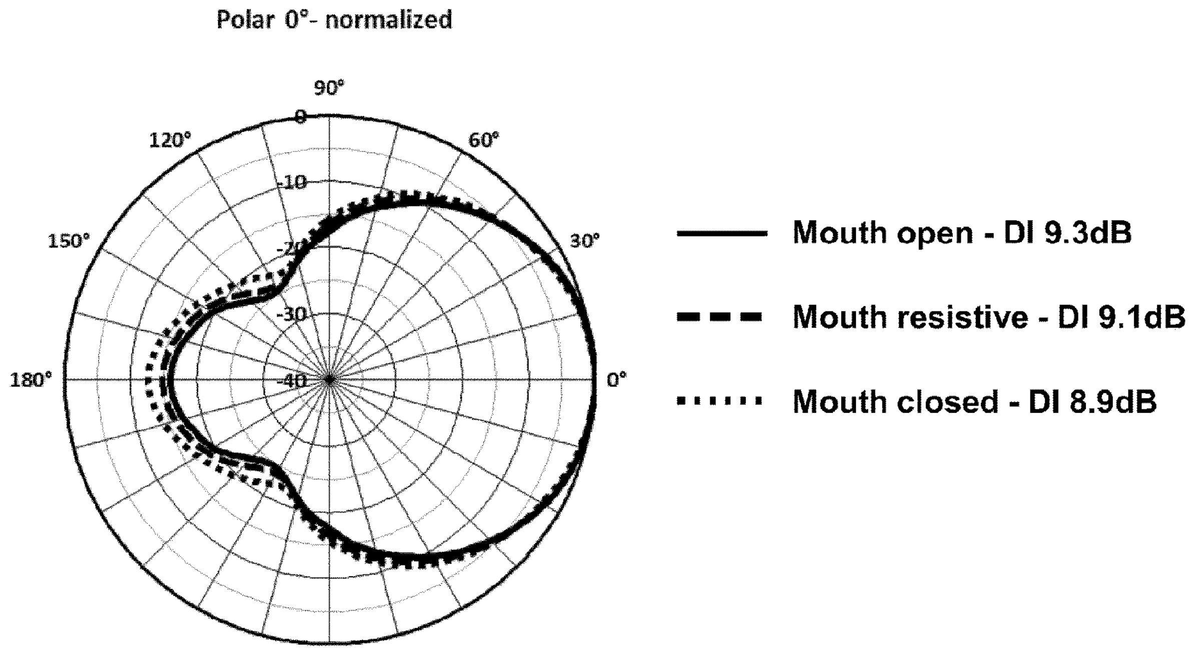
Figure 23:
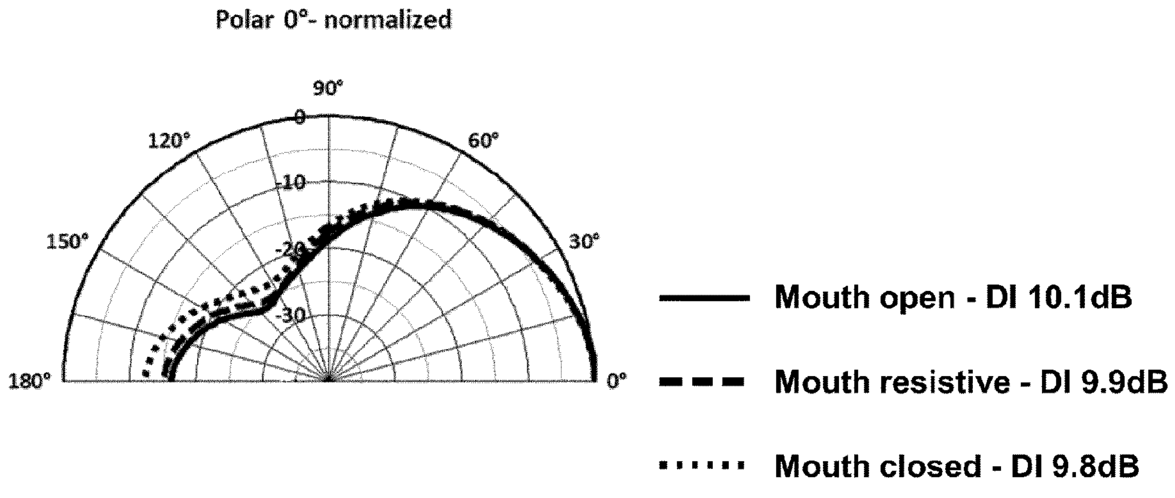

FIG. 22 and FIG. 23 show polar plots of broadband SPL responses and directivity indices (DI) for the loudspeaker assemblies of FIGS. 18*a-c* and FIGS. 19*a-c* respectfully (i.e. in FIG. 22 the loudspeaker assembly is located in free space and in FIG. 23 the loudspeaker assembly is located next to an infinite baffle). The SPL illustrated by the polar plots of FIG. 22 and FIG. 23 is an averaged frequency response from 100 Hz to 10 kHz.

FIG. 22 and FIG. 23 show that presence of a baffle usefully increases the overall DI by about 1 dB in each case.***

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

U.S. Pat. No. 1,984,542
U.S. Pat. No. 1,840,992
DE600150
GB190822965
GB225976
U.S. Pat. No. 3,174,578
US2021105557
WO2016134861
JPH11234784
WO2021185777
GB2112473.0 (not currently published)
WO2019121266
WO/2022/048810.
Leo L. Beranek, Tim J. Mellow, in Acoustics: Sound Fields and Transducers, 2012
https://www.klippel.de/fileadmin/klippel/Files/Know_How/Application_Notes/AN_32_Effective_Radiation_Area.pdf

The invention claimed is:

1. A loudspeaker assembly comprising:

a loudspeaker, including:

- a diaphragm having a first radiating surface for radiating sound in a forward direction and a second radiating surface for radiating sound in a rear direction, wherein the first radiating surface and the second radiating surface are located on opposite faces of the diaphragm;
- a drive unit configured to move the diaphragm based on an electrical signal;
- a drive unit frame, wherein the diaphragm is suspended from the drive unit frame via one or more loudspeaker suspension elements;

a rear enclosure that encloses a volume configured to receive sound produced by the second radiating surface, wherein the rear enclosure includes one or more regions of porous material configured to allow sound produced by the second radiating surface to exit the volume enclosed by the rear enclosure via the one or more regions of porous material; and a waveguide for directing sound produced by the first radiating surface in the forward direction towards a mouth of the waveguide, wherein the waveguide includes one or more regions of porous material configured to allow sound produced by the first radiating surface to exit the waveguide via the one or more regions of porous material;

wherein:

the one or more regions of porous material in the rear enclosure have a specific airflow resistance in the range 1000-10000 Pa·s/m and provide at least 50% of an externally facing surface area of the rear enclosure; and the one or more regions of porous material in the waveguide have a specific airflow resistance in the range 500-5000 Pa·s/m and provide at least 50% of an externally facing surface area of the waveguide.

2. The loudspeaker assembly of claim 1, wherein the one or more regions of porous material in the rear enclosure have a higher specific airflow resistance than the one or more regions of porous material in the waveguide.

3. The loudspeaker assembly of claim 1, wherein the mouth of the waveguide is located at a distance that is in the range 100-500 mm from the first radiating surface, as measured in the forward direction.

4. The loudspeaker assembly of claim 1, further comprising one or more wings projecting outwardly from the loudspeaker assembly in a lateral direction.

5. The loudspeaker assembly of claim 4, wherein the one or more wings include one or more regions of porous material.

6. The loudspeaker assembly of claim 1, further comprising a portion of porous material located in front of the second radiating surface in the volume enclosed by the rear enclosure.

7. The loudspeaker assembly of claim 1, further comprising a light source wherein the light source is configured to project light from the mouth of the waveguide.

8. The loudspeaker assembly of claim 7, wherein the light source is located in the waveguide in front of the first radiating surface of the diaphragm.

9. The loudspeaker assembly of claim 7, wherein the light source is located in the loudspeaker, wherein the loudspeaker includes a transparent element or opening in a forward-facing surface of the loudspeaker that is configured to allow light from the light source to pass therethrough.

10. The loudspeaker assembly of claim 1, wherein the mouth of the waveguide is located in front of the entire rear enclosure.

11. A headrest including a loudspeaker assembly, the loudspeaker assembly comprising:

a loudspeaker, including:

a diaphragm having a first radiating surface for radiating sound in a forward direction and a second radiating surface for radiating sound in a rear direction, wherein the first radiating surface and the second radiating surface are located on opposite faces of the diaphragm;

a drive unit configured to move the diaphragm based on an electrical signal;

a drive unit frame, wherein the diaphragm is suspended from the drive unit frame via one or more loudspeaker suspension elements;

a rear enclosure that encloses a volume configured to receive sound produced by the second radiating surface, wherein the rear enclosure includes one or more regions of porous material configured to allow sound produced by the second radiating surface to exit the volume enclosed by the rear enclosure via the one or more regions of porous material; and a waveguide for directing sound produced by the first radiating surface in the forward direction towards a mouth of the waveguide, wherein the waveguide includes one or more regions of porous material configured to allow sound produced by the first radiating surface to exit the waveguide via the one or more regions of porous material;

wherein the waveguide of the loudspeaker assembly is at least partially formed by internal contours of the headrest;

wherein:

the one or more regions of porous material in the rear enclosure have a specific airflow resistance in the range 1000-10000 Pa·s/m and provide at least 50% of an externally facing surface area of the rear enclosure; and the one or more regions of porous material in the waveguide have a specific airflow resistance in the range 500-5000 Pa·s/m and provide at least 50% of an externally facing surface area of the waveguide.

12. The headrest of claim 11 wherein the loudspeaker assembly is a first loudspeaker assembly and the headrest includes a second loudspeaker assembly, including:

a loudspeaker, including:

a diaphragm having a first radiating surface for radiating sound in a forward direction and a second radiating surface for radiating sound in a rear direction, wherein the first radiating surface and the second radiating surface are located on opposite faces of the diaphragm;

a drive unit configured to move the diaphragm based on an electrical signal;

a drive unit frame, wherein the diaphragm is suspended from the drive unit frame via one or more loudspeaker suspension elements;

a rear enclosure that encloses a volume configured to receive sound produced by the second radiating surface, wherein the rear enclosure includes one or more regions of porous material configured to allow sound produced by the second radiating surface to exit the volume enclosed by the rear enclosure via the one or more regions of porous material; and a waveguide for directing sound produced by the first radiating surface in the forward direction towards a mouth of the waveguide, wherein the waveguide includes one or more regions of porous material configured to allow sound produced by the first radiating surface to exit the waveguide via the one or more regions of porous material;

wherein:

the one or more regions of porous material in the rear enclosure have a specific airflow resistance in the range 1000-10000 Pa·s/m and provide at least 50% of an externally facing surface area of the rear enclosure; and the one or more regions of porous material in the waveguide have a specific airflow resistance in the range 500-5000 Pa·s/m and provide at least 50% of an externally facing surface area of the waveguide, wherein the first and second loudspeaker assemblies are arranged on opposite sides of the headrest such that, when a user is sat in the seat, the waveguides of the mouths of the first and second loudspeaker assemblies face towards the head of the user.

13. The headrest of claim 12 including a third loudspeaker, wherein the third loudspeaker is a bass loudspeaker and the first and second loudspeaker assemblies are respectively located on either side of the third loudspeaker.

14. A lamp including a loudspeaker assembly, the loudspeaker assembly comprising:

a loudspeaker, including:

a diaphragm having a first radiating surface for radiating sound in a forward direction and a second radiating surface for radiating sound in a rear direction, wherein the first radiating surface and the second radiating surface are located on opposite faces of the diaphragm;

a drive unit configured to move the diaphragm based on an electrical signal;

a drive unit frame, wherein the diaphragm is suspended from the drive unit frame via one or more loudspeaker suspension elements;

a rear enclosure that encloses a volume configured to receive sound produced by the second radiating surface, wherein the rear enclosure includes one or more regions of porous material configured to allow sound produced by the second radiating surface to exit the volume enclosed by the rear enclosure via the one or more regions of porous material;

a waveguide for directing sound produced by the first radiating surface in the forward direction towards a mouth of the waveguide, wherein the waveguide includes one or more regions of porous material configured to allow sound produced by the first radiating surface to exit the waveguide via the one or more regions of porous material; and a light source wherein the light source is configured to project light from the mouth of the waveguide;

wherein:

the one or more regions of porous material in the rear enclosure have a specific airflow resistance in the range 1000-10000 Pa·s/m and provide at least 50% of an externally facing surface area of the rear enclosure; and the one or more regions of porous material in the waveguide have a specific airflow resistance in the range 500-5000 Pa·s/m and provide at least 50% of an externally facing surface area of the waveguide.

* * * * *